(12) United States Patent
Nakagome et al.

(10) Patent No.: US 8,662,229 B2
(45) Date of Patent: Mar. 4, 2014

(54) SADDLE-RIDE VEHICLE

(75) Inventors: Hiroshi Nakagome, Wako (JP); Tadashi Oshima, Wako (JP); Kyohei Hosoya, Wako (JP); Sunao Kawano, Wako (JP); Manabu Fujii, Wako (JP); Takeshi Kamiyama, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 48 days.

(21) Appl. No.: 13/371,477

(22) Filed: Feb. 13, 2012

(65) Prior Publication Data

US 2012/0234619 A1 Sep. 20, 2012

(30) Foreign Application Priority Data

Mar. 19, 2011 (JP) ................................. 2011-061825

(51) Int. Cl.
*B62D 61/02* (2006.01)
(52) U.S. Cl.
USPC .......... 180/219; 180/9.25; 180/218; 280/833; 70/233
(58) Field of Classification Search
USPC ............................ 180/9.25, 218, 219; 280/833
See application file for complete search history.

(56) References Cited

U.S. PATENT DOCUMENTS

| | | | | |
|---|---|---|---|---|
| 5,147,077 A | * | 9/1992 | Nakajima et al. | 224/413 |
| 5,535,608 A | * | 7/1996 | Brin | 70/256 |
| 2001/0022248 A1 | * | 9/2001 | Mori et al. | 180/219 |
| 2003/0042261 A1 | * | 3/2003 | Cantor | 220/564 |
| 2007/0144802 A1 | * | 6/2007 | Tsuya | 180/68.2 |
| 2009/0078228 A1 | * | 3/2009 | Tsutsumizaki et al. | 123/143 B |

FOREIGN PATENT DOCUMENTS

| | | | | |
|---|---|---|---|---|
| EP | 482610 A1 | * | 4/1992 | B62J 11/00 |
| JP | 03-220072 | | 9/1991 | |
| JP | 2008-207695 | | 9/2008 | |

* cited by examiner

*Primary Examiner* — Tony Winner
*Assistant Examiner* — Conan Duda
(74) *Attorney, Agent, or Firm* — Ditthavong Mori & Steiner, P.C.

(57) ABSTRACT

A saddle-ride vehicle includes a vehicle-body frame, an engine, a seat, a storage box, a box lid, a box-side locking mechanism, a filler lid, a filler-side locking mechanism, an unlocking mechanism, a box-side cable, and a filler-side cable. The unlocking mechanism includes a key cylinder which is key-operated. The unlocking mechanism is disposed between a head pipe and the storage box. The box-side cable is connected to the key cylinder. The box-side cable is to be caused to unlock a lock of the box-side locking mechanism by turning a key in one of a clockwise direction and a counterclockwise direction. The filler-side cable is connected to the key cylinder. The filler-side cable is to be caused to unlock a lock of the filler-side locking mechanism by turning the key in another of the clockwise direction and the counterclockwise direction.

9 Claims, 23 Drawing Sheets

SADDLE-RIDE VEHICLE

CROSS-REFERENCE TO RELATED APPLICATIONS

The present application claims priority under 35 U.S.C. §119 to Japanese Patent Application No. 2011-061825, filed Mar. 19, 2011. The contents of this application are incorporated herein by reference in their entirety.

BACKGROUND OF THE INVENTION

1. Field of the Invention

The present invention relates to a saddle-ride vehicle.

2. Discussion of the Background

A structure is disclosed in which a storage box arranged between a head pipe of a vehicle-body frame and a seat is openably and closably covered with a lid, and a locking mechanism for the lid of the storage box is arranged frontward of the storage box (see Japanese Patent Application Publication No. 2008-207695).

In general, the space at the front of a storage box tends to be a dead space. Such a structure as that of Conventional Example 1 makes it possible to effectively utilize the dead space to provide a locking mechanism in a space-efficient manner.

In addition, as another conventional example, a configuration is described in which a storage box is arranged between a handle and a seat, a lid of the storage box is locked by a solenoid locking mechanism, and is unlocked depending on a turned position of an ignition key relative to an ignition switch. Moreover, a structure is also disclosed in which a fuel tank is arranged below a seat with a fuel filler of the fuel tank positioned rearward of the seat, and fueling is allowed by opening a openable/closable lid provided to a tail cover rearward of the seat (see Japanese Patent Application Publication No. Hei 03-220072).

SUMMARY OF THE INVENTION

According to one aspect of the present invention, a saddle-ride vehicle includes a vehicle-body frame, an engine, a seat, a storage box, a box lid, a box-side locking mechanism, a filler lid, a filler-side locking mechanism, an unlocking mechanism, a box-side cable, and a filler-side cable. The vehicle-body frame has a head pipe and left and right main frames extending rearward from the head pipe. The engine is supported on the vehicle-body frame. A driver sits on the seat. The storage box is disposed between the left and right main frames and includes an opening portion opening upward. The box lid is to openably and closably cover the opening portion of the storage box. The box-side locking mechanism is to lock the box lid. The filler lid is to openably and closably cover a fuel filler of a fuel tank. The filler-side locking mechanism is to lock the filler lid. The unlocking mechanism includes a key cylinder which is key-operated. The unlocking mechanism is disposed between the head pipe and the storage box. The box-side cable is connected to the key cylinder. The box-side cable is to be caused to unlock a lock of the box-side locking mechanism by turning a key in one of a clockwise direction and a counterclockwise direction. The filler-side cable is connected to the key cylinder. The filler-side cable is to be caused to unlock a lock of the filler-side locking mechanism by turning the key in another of the clockwise direction and the counterclockwise direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
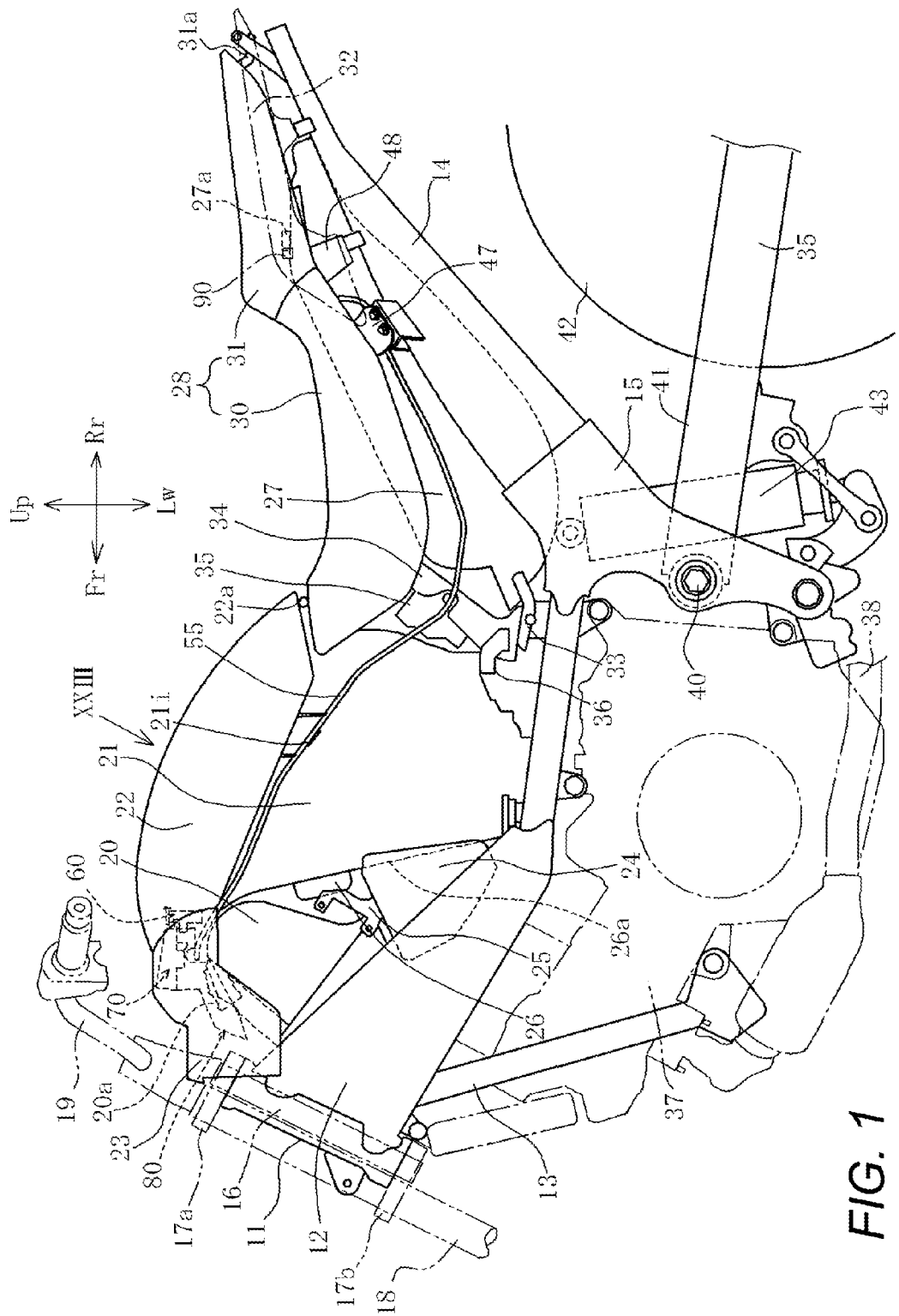
FIG. 1 is a left-side view of a main part of a motorcycle according to an embodiment.

The embodiments will now be described with reference to the accompanying drawings, wherein like reference numerals designate corresponding or identical elements throughout the various drawings.

Figure 2:
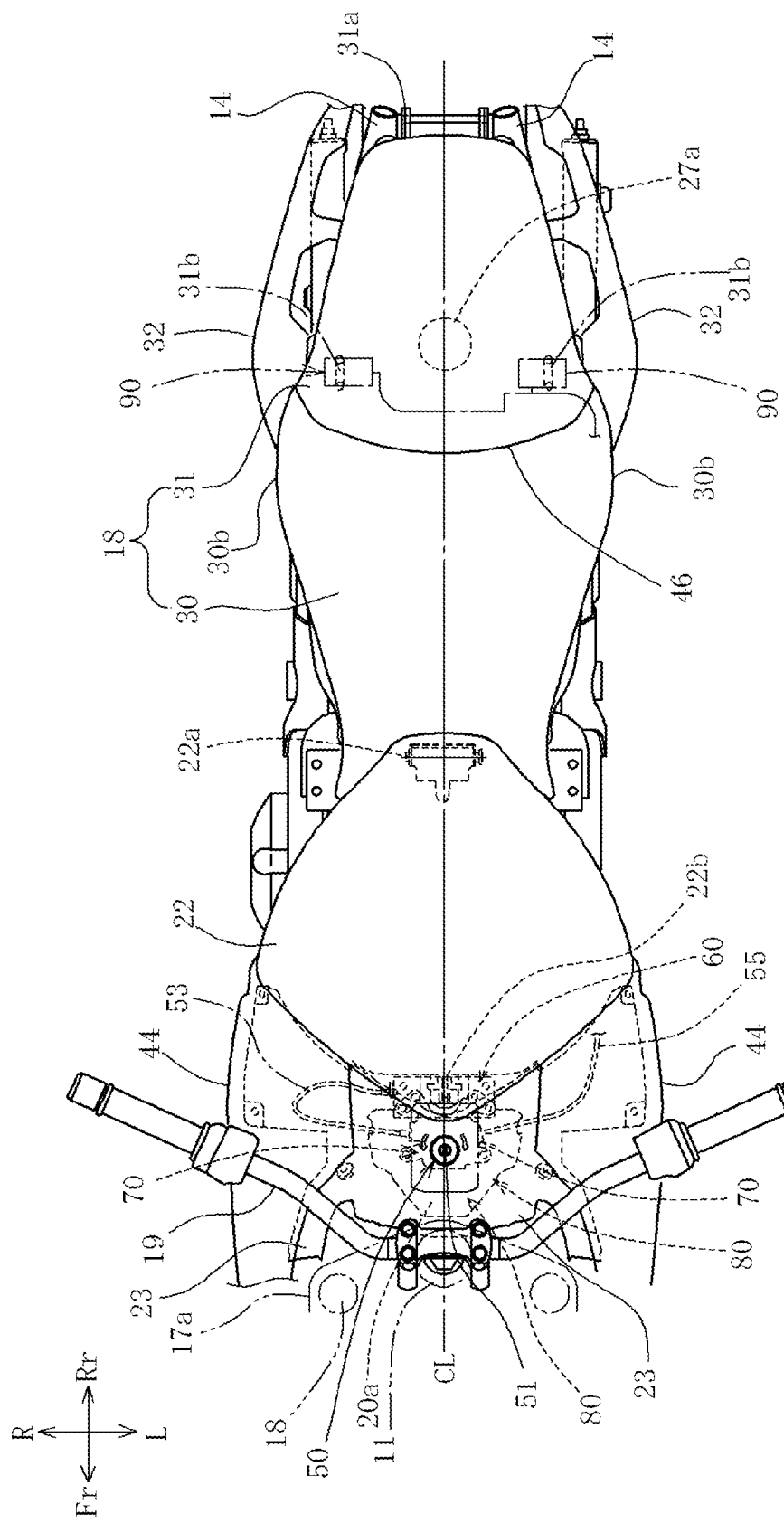
FIG. 2 is a left-side view of the main part of the main part of the vehicle.
Figure 3:
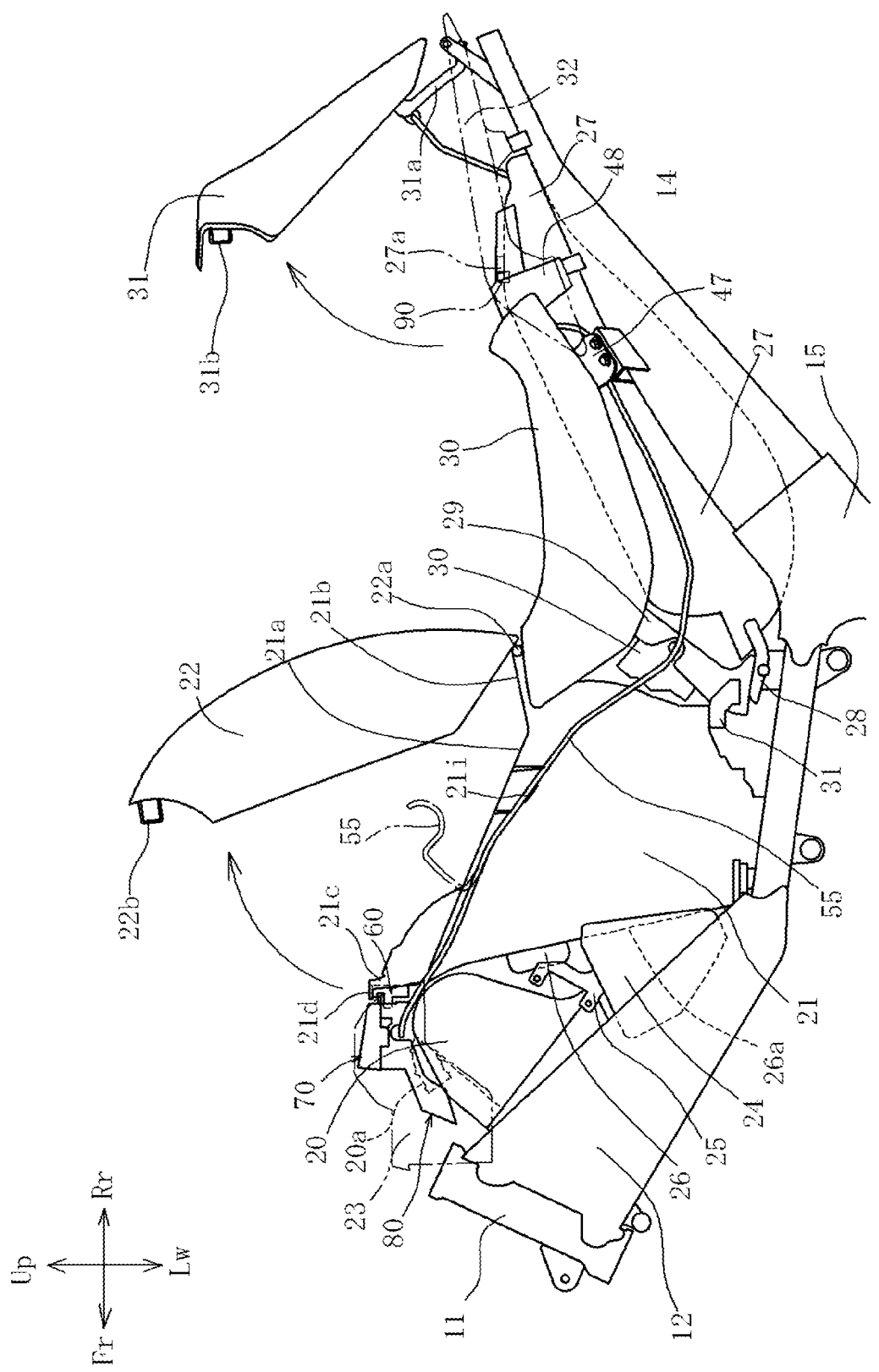
FIG. 3 shows a state where front and rear lids are opened.

First, an overall configuration of a vehicle according to the embodiment will be described on the basis of FIG. 1 to FIG. 3. FIG. 1 is a left-side view of a vehicle main part of a motorcycle that is an example of a saddle-ride vehicle with a vehicle-body frame portion thereof situated at the center. FIG. 2 is a plan view of a vehicle-body main part, and FIG. 3 is a view enlarging part of FIG. 1 and showing a state where two lids arranged on front and rear sides are opened.

It should be noted that, in the description of the present application, the terms "front/rear," "left/right," and "upper/lower" are based on the state of the vehicle to which the embodiment of the present invention is applied, and the respective directions are denoted by Fr (front) and Rr (rear), L (left) and R (right), and Up (upper) and Lw (lower) in the drawings as necessary.

In FIG. 1, a vehicle-body frame 10 includes: a head pipe 11 at the front end; a main frame 12 branching from the head pipe 11 to the left and right and extending rearward; a single front frame 13 extending obliquely downward to the rear from a position behind the head pipe 11 and near a front portion of the main frame 12; a pair of left and right seat rails 14 extending obliquely upward and further rearward behind the main frame 12; and a pair of left and right pivot plates 15 coupling rear end portion of the main frame 12 and front end portions of the seat rails 14 and extending obliquely downward to the front.

A steering shaft 16 is turnably supported in the head pipe 11, and a top bridge 17a and a bottom bridge 17b are coupled to upper and lower end portions of the steering shaft 16. Upper end portions of a pair of left and right front forks 18 are supported on these top bridge 17a and bottom bridge 17b, and an unillustrated front wheel is rotatably supported between lower end portions of the left and right front forks 18. A bar-handle 19 is attached to the top bridge 17a such that the front wheel can be steered by turning the bar-handle 19.

An air cleaner 20 and a storage box 21 are supported on the main frame 12. The storage box 21 is open upward, and is shaped like a container with such a large capacity as to be capable of storing a helmet or the like. The upper opening of the storage box 21 is opened and closed by a box lid 22.

The box lid 22 is openably and closably coupled at a rear end portion thereof to an upper end of a rear portion of the storage box 21 by a box-lid-side hinge mechanism 22a. When closed, the box lid 22 is locked at a front end portion side thereof by a box-side locking mechanism 60 (schematically shown in FIG. 1 to FIG. 3. Note that the same applies to a filler-side locking mechanism 90, described later).

An upper portion of the air cleaner 20 and a front portion of the box lid 22 are covered with a front top cover 23. The front top cover 23 covers also an air cleaner cover 80 and a key stay 70 of an unlocking mechanism, which will be described later. In particular, since the front top cover 23 covers the key stay 70 supporting a key cylinder (described later) of the unlocking mechanism, the front top cover 23 thus serves also as a key-stay cover in the embodiment of the present invention. A front end of the front top cover 23 extends to near an upper portion of the head pipe 11.

A battery case 24 is provided frontward of the storage box 21 and adjacent to a lower portion of a front wall thereof. A battery (illustration of which is omitted) is housed in the battery case 24. A stay 25 protruding upward is provided on an upper surface of the battery case 24, and supports a rear portion of the air cleaner 20. Further, a tool box 26 protruding frontward is provided on a front portion of the storage box 21, which is above the battery case 24. The tool box 26 is formed integrally with a front-surface lid 26a configured to be attachable to and detachable from a front portion of a peripheral wall of the storage box 21.

A fuel tank 27 is supported on the seat rails 14. A seat 28 is supported on the fuel tank 27. The seat 28 is formed long in a front-rear direction for a passenger, and has a front portion formed as a rider seat (driver seat) 30 and a rear portion formed as a pillion seat 31 for a passenger.

The pillion seat 31 is openable and closable on the front end portion side thereof by using a hinge mechanism 31a provided on the rear end portion side thereof. Opening the pillion seat 31 in front allows a filler cap 27a of the fuel tank 27, which is arranged below the front portion of the pillion seat 31, to be detached for fueling. Accordingly, the pillion seat 31 serves also as a filler lid in the embodiment of the present invention.

Grab rails 32 are provided on the left and right sides of the pillion seat 31.

The fuel tank 27 is formed long in the front-rear direction over substantially the entire length of the seat 28, and is arranged to be generally inclined downward to the front along the seat rails 14. The filler cap 27a is detachably attached onto a fuel filler (illustration of which is omitted) located on an uppermost portion on the rear-half portion side of the fuel tank 27, and is configured such that fuel poured in the fuel filler with the filler cap 27a detached is allowed to smoothly flow to the front-half portion side of the fuel tank 27.

The front-half portion side of the fuel tank 27 is a large-capacity portion located below the rider seat 30, and enters deep between the left and right seat rails 14.

A tank stay 33 is provided on a rear end portion of the main frame 12, and a front end portion of the fuel tank 27 is supported on the tank stay 33.

A seat stay 34 extending obliquely upward to the rear is provided on the tank stay 33, and a lower side of a front portion of the rider seat 30 is supported on an upper end portion of the seat stay 34.

An ECU box 35 is supported on a middle portion of the seat stay 34 in an up-down direction.

The ECU box 35 is disposed in a dead space surrounded by the storage box 21, the rider seat 30, the fuel tank 27, and the main frame 12. A known ECU for controlling various electronic devices such as a fuel injection device is housed in the ECU box 35.

A box stay 36 extending obliquely upward to the front is provided on a lower portion of the seat stay 34, and a rear end of a bottom portion of the storage box 21 is supported by the box stay 36.

An engine 37 is disposed below the main frame 12, and is supported at an upper portion thereof by the main frame 12. The engine 37 is further supported at a front portion thereof by the front frame 13 and at a rear portion thereof by the pivot plates 15.

The vehicle-body frame 10 forms a diamond frame structure by utilizing the engine 37 as a part of the frame structure.

Air is taken into a cylinder head of the engine 37 through the air cleaner 20, and is exhausted through an exhaust pipe 38.

A swingarm 41 is swingably supported at a front end thereof on the pivot plates 15 by a pivot shaft 40. A rear wheel 42 is supported on a rear end of the swingarm 41, and is driven by the engine 37 via a chain (illustration of which is omitted). Reference Numeral 43 denotes a shock absorber, which is supported at an upper end thereof on the vehicle-body frame 10 and is attached at a lower end portion thereof to a link mechanism provided between the swingarm 41 and the pivot plates 15.

FIG. 2 is a plan view of the vehicle-body main part. A rear side of the head pipe 11 and a front side of the box lid 22 are covered with the front top cover 23.

A most part of the front top cover 23 is covered with front side covers 44 from left and right, and a portion of the front top cover 23 exposed on a vehicle-body surface is a center portion along a vehicle-body center line CL in front of the box lid 22.

In the portion of the front top cover 23, which is exposed on the vehicle-body surface, an upper end portion of a key cylinder 51 included in an unlocking mechanism 50 is exposed in a middle portion between the head pipe 11 and the front end of the box lid 22. The unlocking mechanism 50 is a mechanism for unlocking each of the box-side locking mechanism 60 for locking the box lid 22 and the filler-side locking mechanism 90 for locking the pillion seat 31.

The key cylinder 51 is configured to unlock these locking mechanisms with a common operation, and the unlocking operation of the key cylinder 51 is transmitted to the box-side locking mechanism 60 through a box-side cable 53, and is transmitted to the filler-side locking mechanism 90 through a filler-side cable 55.

The key cylinder 51 is supported on the key stay 70. The key stay 70 is disposed below the front top cover 23, and is attached to the front top cover 23. The front top cover 23 covers the upper surface side of the key stay 70, and functions as the key-stay cover. An air cleaner cover 80 is disposed below the key stay 70, and is attached to the key stay 70. Consequently, the key stay 70 and the air cleaner cover 80 are supported on the front top cover 23.

The box lid 22 has a substantially rhombus shape protruding to the front, rear, left, and right, and has a rear end portion protruding rearward to overlap onto a front end portion of the rider seat 30. The box-lid-side hinge mechanism 22a is provided between the front end portion of the rider seat 30 and the rear end portion of the box lid 22.

The rider seat 30 has a front portion narrow in width, and increases in width toward the rear, and then decreases in width from a maximum width portion 30b toward the rear, which is a mating portion 46 with the front end of the pillion seat 31.

The pillion seat 31 gradually decreases in width from the mating portion 46 toward the rear, and the grab rails 32 protrude out on the left and right sides of the pillion seat 31.

FIG. 3 enlarges part of FIG. 1 and shows the state where the box lid 22 and the pillion seat 31 are opened.

A lock fitting 22b having a substantially squared U-shape in a side view is provided on the front end portion of the box lid 22, and is capable of locking into the box-side locking mechanism 60 provided frontward of a peripheral-edge front end portion 21c of the storage box 21.

When the box lid 22 is closed, the lock fitting 22b is locked by the box-side locking mechanism 60, so that the box lid 22 cannot be opened. The box-side locking mechanism 60 is unlocked by the key cylinder 51. When the lock fitting 22b is released, the front end side of the box lid 22 is turned rearward about the box-lid-side hinge mechanism 22a, so that the box lid 22 is opened in front to open the opening portion of the storage box 21.

The key stay 70 is provided frontward of the box-side locking mechanism 60. In this figure, the front top cover 23 is omitted. The air cleaner cover 80 covering the upper portion of the air cleaner 20 is attached to the lower portion of the key stay 70. The air cleaner cover 80 covers above an intake duct 20a extending frontward from the upper portion of the air cleaner 20 while curving in an upward arc, and in this sense, is also a duct cover.

Reference Numeral 55 denotes the filler-side cable, which has a front end coupled to the key cylinder 51, passes by the left side surface of the storage box 21, below the rider seat 30, and by the left side surface of the fuel tank 27, and then is coupled to the filler-side locking mechanism 90 provided rearward of the rider seat 30.

The filler-side cable 55 is supported on a side surface of the storage box 21 by a supporting portion 21i integrally formed to laterally protrude on the storage box 21.

The filler-side locking mechanism 90 is configured to lock the front end of the pillion seat 31, and the filler-side cable 55 transmits the operation of unlocking the filler-side locking mechanism 90.

When the front end of the pillion seat 31 is locked, the pillion seat 31 is fixed not to be openable. When unlocked by pulling the filler-side cable 55, the front end of the pillion seat 31 is released, and the pillion seat 31 is thus opened in front by using the hinge mechanism 31a at the rear end of the pillion seat 31, so that the upside of the filler cap 27a of the fuel tank 27 is opened.

Reference Numeral 47 denotes a cross plate supporting the rear end portion of the rider seat 30, and the cross plate 47 is laid between the left and right seat rails 14. Front ends of the grab rails 32 are fastened to the cross plate 47. In addition, the filler-side cable 55 passes on the side surface of the fuel tank 27 and above the seat rail 14 on the inner side of the cross plate 47.

Reference Numeral 48 denotes a locking-portion cross plate provided below the front end portion of the pillion seat 31, and the locking-portion cross plate 48 extends above the fuel tank 27, and is laid between the left and right seat rails 14. In addition, the filler-side locking mechanism 90 is supported on the locking-portion cross plate 48.

It should be noted that, although, out of the vehicle-body side surface, a portion below the front top cover 23 and the box lid 22 to the main frame 12 and a portion below the seat 28 are covered with various vehicle-body covers, these vehicle-body covers are omitted except for the front side cover (FIG. 2) in FIGS. 1 to 3.

Next, the unlocking mechanism 50 will be described on the basis of FIG. 4 to FIG. 13.

Figure 4:
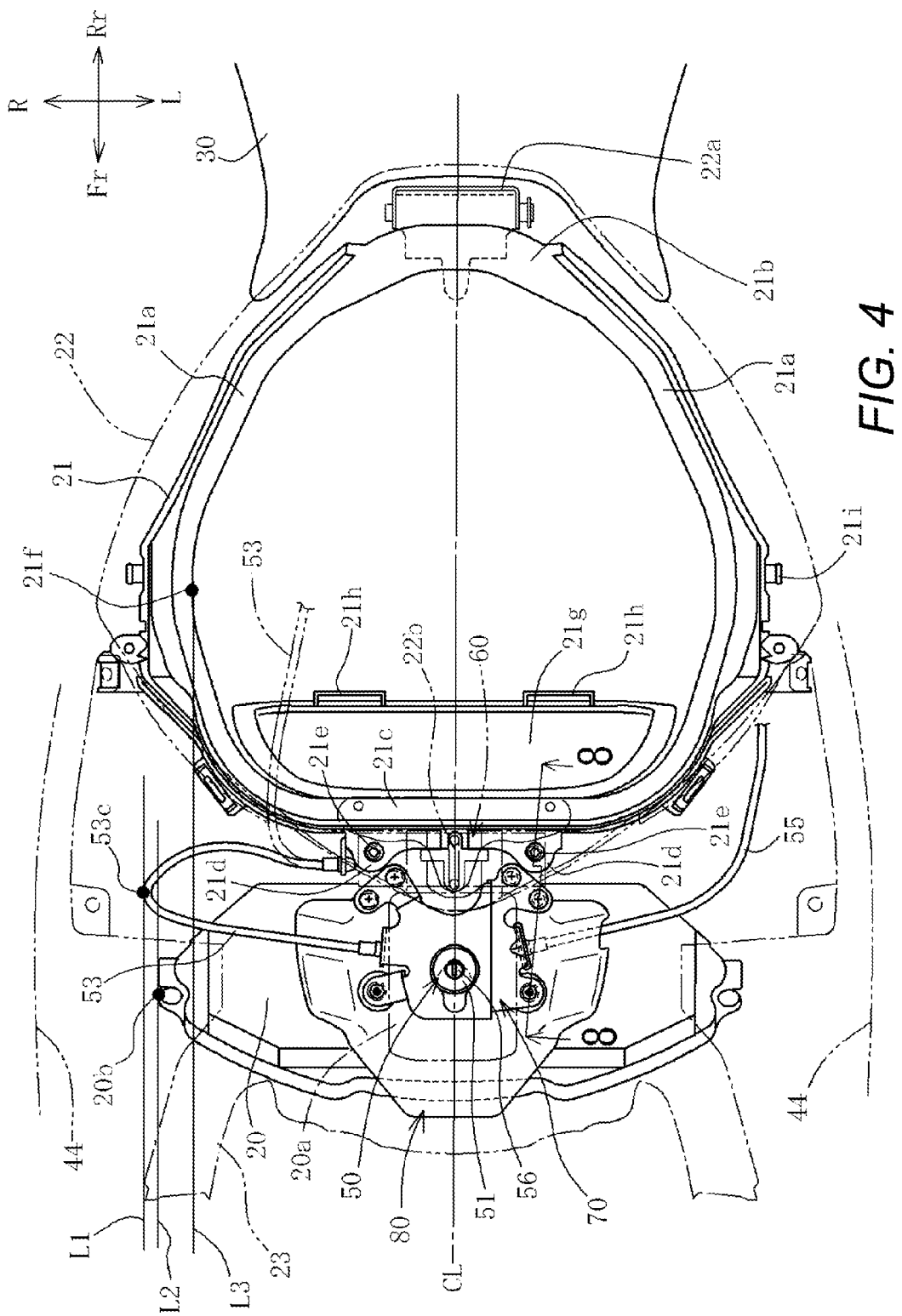
FIG. 4 is a plan view of the main part, showing a key cylinder and a portion surrounding the key cylinder.

FIG. 4 is a plan view of the vehicle-body main part, showing the portion of the unlocking mechanism 50 while excluding the front top cover 23. In this figure, the box-side cable 53 and the filler-side cable 55 are connected from the right and left to the key cylinder 51 supported on the key stay 70.

The box-side cable 53 extends out to the right side of the vehicle body from the right side of the key stay 70, is then curved and bent back at a position outwardly beyond an outermost side portion 20b of the air cleaner 20, and is connected to the box-side locking mechanism 60 attached to the upper portion of the front end of the storage box 21.

Reference Numeral L1 denotes a line which is parallel to the vehicle-body center line CL and indicates the position of an outermost side portion 53b of the box-side cable 53. Reference Numeral L2 denotes a line which is parallel to L1 and passes the outermost side portion 20b of the air cleaner 20. Reference Numeral L3 is a line which is parallel to L1 and passes an opening-portion outermost side portion 21f of the storage box 21.

These lines L1, L2, and L3 are located more outward in this order, and particularly, L1 is located outward of L2. It should be noted that the outermost side portion 53b is located on the inner side of the front side cover 44.

Positioning the outermost side portion 53b as outward as possible in this manner makes it possible to form a large flexure of the box-side cable 53. This flexure contributes to an improvement in maintainability of the air cleaner 20.

Specifically, in the maintenance of the air cleaner 20, when the air cleaner cover 80 covering the air cleaner 20 is turned over together with the key stay 70 and the front top cover 23 to be moved above the storage box 21, the box-side cable 53 with one end coupled to the key cylinder 51 integrated with these covers and stay is allowed to be stretched long to the rear by the flexure as indicated by an imaginary line. Accordingly, this makes it possible to largely move the air cleaner cover 80 and the like, and thus to enable easy maintenance with the upper side of the air cleaner 20 being sufficiently widely opened.

During the movement of the air cleaner cover 80 and the like at the maintenance, the filler-side cable 55 is also bent rearward to a large extent, thereby assisting the movement of the air cleaner cover 80 and the like, as indicated by an imaginary line in FIG. 3. At this time, since the filler-side cable 55 is routed long in the front-rear direction, the filler-side cable 55 does not need to be largely flexed like the box-side cable 53. The filler-side cable 55 is bent rearward at the portion frontward of the supporting portion 21*i* on the side surface of the storage box 21, thereby enabling the air cleaner cover 80 and the like to be moved sufficiently widely.

An opening 21*g* is provided in the front portion of the storage box 21, and is configured to be covered with the separate front-surface lid 26*a* (see FIGS. 1 and 3) attachably and detachably. An insertion hole 21*h* is provided in a bottom portion of the storage box 21 adjacent to a lower end portion of the opening 21*g*. The front-surface lid 26*a* is attached by inserting an unillustrated claw formed on the lower end portion of the front-surface lid 26*a* into the insertion hole 21*h*, and then fastening the upper end portion of the front-surface lid 26*a* to the vicinity of the peripheral-edge front end portion 21*c* of the storage box 21 with bolts 26*f* (see FIG. 23).

Figure 5:
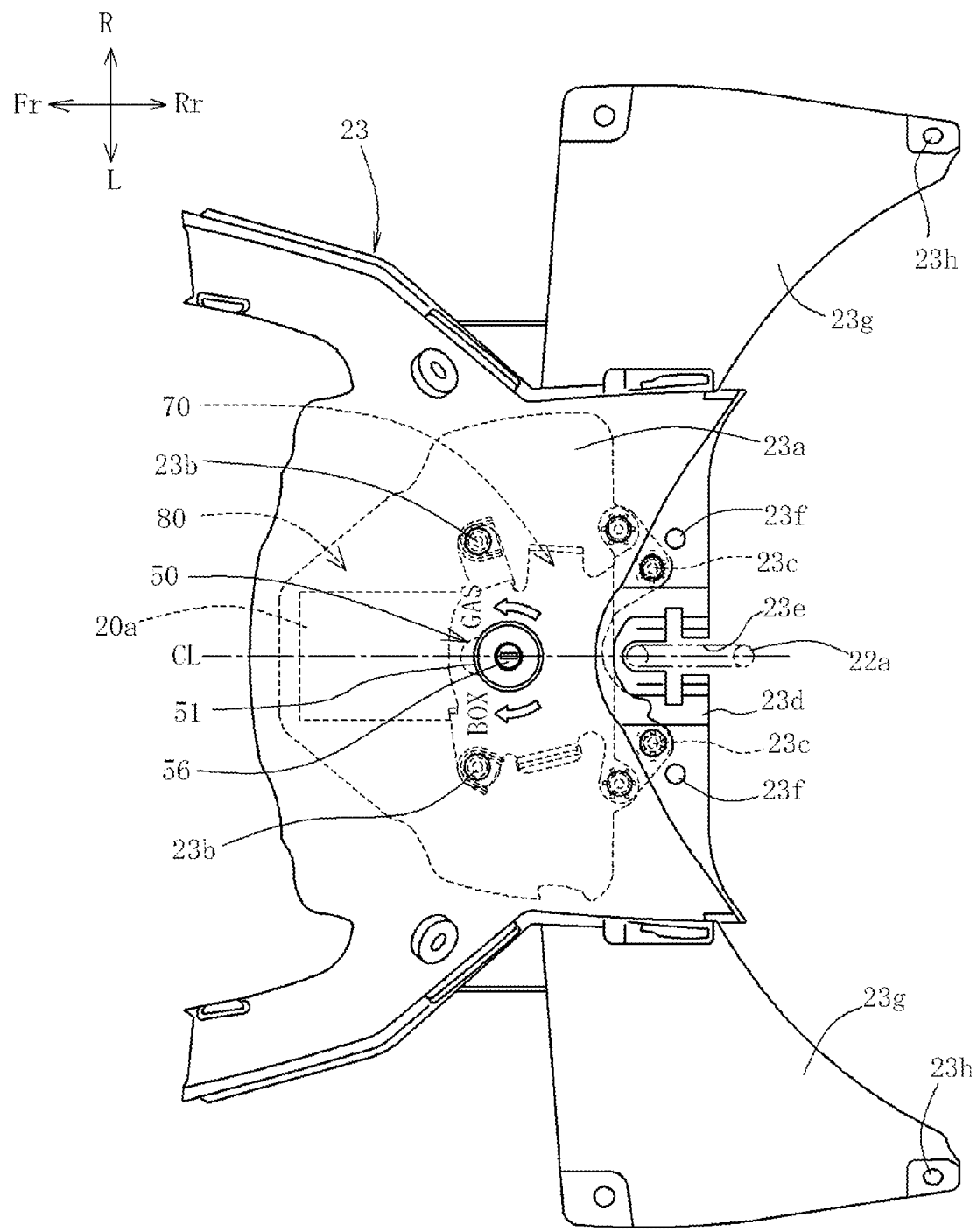
FIG. 5 is a plan view of a front top cover.

FIG. 5 is a plan view of the front top cover 23, and shows a state where the key stay 70 and the air cleaner cover 80 are overlapped with and attached to the lower side of the front top cover 23.

The key stay 70 overlaps below a main-body portion 23*a* at the center of the front top cover 23, and the front top cover 23 is fastened together with the key stay 70 and the air cleaner cover 80 at boss portions 23*b* integrally formed by protruding the front portion side of the front top cover 23 downward. The rear portion side of the front top cover 23 is fastened to only the key stay 70 at boss portions 23*c* integrally formed by protruding the rear portion side downward.

A key operation sign indicating the turning directions of a key 58 (see FIG. 12) for operating the key cylinder 51 is given around a key insertion hole 56 provided above the upper end portion of the key cylinder 51 in the upper surface of the main-body portion 23*a* of the front top cover 23.

This key operation sign includes a "BOX" sign and a "GAS" sign given respectively at the left and right sides of the key insertion hole 56 as well as direction signs of arrows indicating directions to turn the key 58 for unlocking the respective locks.

Note that the key operation sign may include icons or illustration.

The "BOX" sign indicates that turning the key 58 inserted in the key insertion hole 56 clockwise in the direction indicated by the left arrow activates the box-side locking mechanism 60, which is the object of the unlocking operation using the key 58, and thereby causes the box lid 22 to be unlocked to be opened.

The "GAS" sign on the right side indicates that turning the key 58 counterclockwise in the direction indicated by the right arrow activates the filler-side locking mechanism 90, which is the object of the unlocking operation using the key 58, and thereby causes the pillion seat 31 to be unlocked to be opened.

This key operation sign can be formed integrally on the front top cover 23 when the front top cover 23 is molded, by engraving or embossing signs for the "GAS" and "BOX" as well as arrow signs corresponding thereto on a molding surface of a mold in advance. It should be noted that the integrally forming method is not limited to the engraving or the like in the mold, and for example, the signs may be given by printing or the like after the front top cover 23 is molded.

Providing the key operation sign integrally on the front top cover 23 makes it possible to improve the convenience in use and to reduce the number of components as compared with a case where key operation signs are formed in separate plates or the like and attached to the surface of the front top cover 23.

The rear side of the main-body portion 23*a* is formed into a step portion 23*d* lowered in level, and the front portion of the front top cover 23 is overlapped above the step portion 23*d* to be flush.

A cut-out groove 23*e* is formed in the center of the step portion 23*d* in the left-right direction. The cut-out groove 23*e* is open rearward and long in the front-rear direction, and is configured such that the lock fitting 22*b* is inserted into and removed from the cut-out groove 23*e*.

Moreover, the bosses 23*c* and through-holes 23*f* near the bosses 23*c* are provided in the step portion 23*d*. The bosses 23*c* are fastening portions to the key stay 70 and formed to protrude downward. The through-holes 23*f* are provided on the rear end portion of the step portion 23*d*, and fastened to the front portion of the storage box 21. Bulged portions 23*g* bulging to the left and right are provided on the left and right of the rear portion of the main-body portion 23*a*, and fastened to the left and right of the front portion of an opening peripheral edge portion 21*a* (see FIG. 2) of the storage box 21 with attachment holes 23*h* on the rear end portions.

Figure 6:
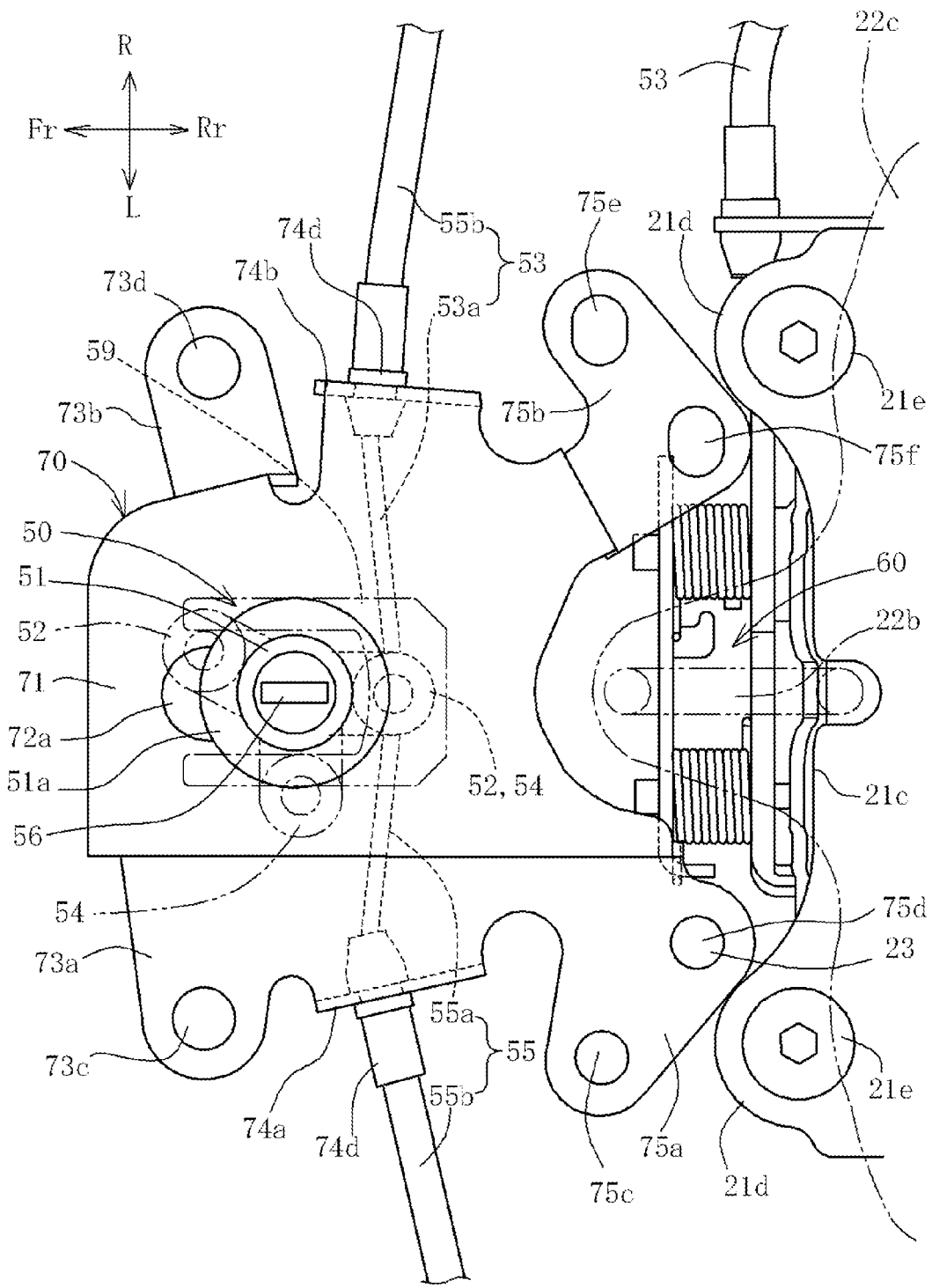
FIG. 6 is a view showing an arrangement in plane of a key stay and a box-side locking mechanism.
Figure 7:
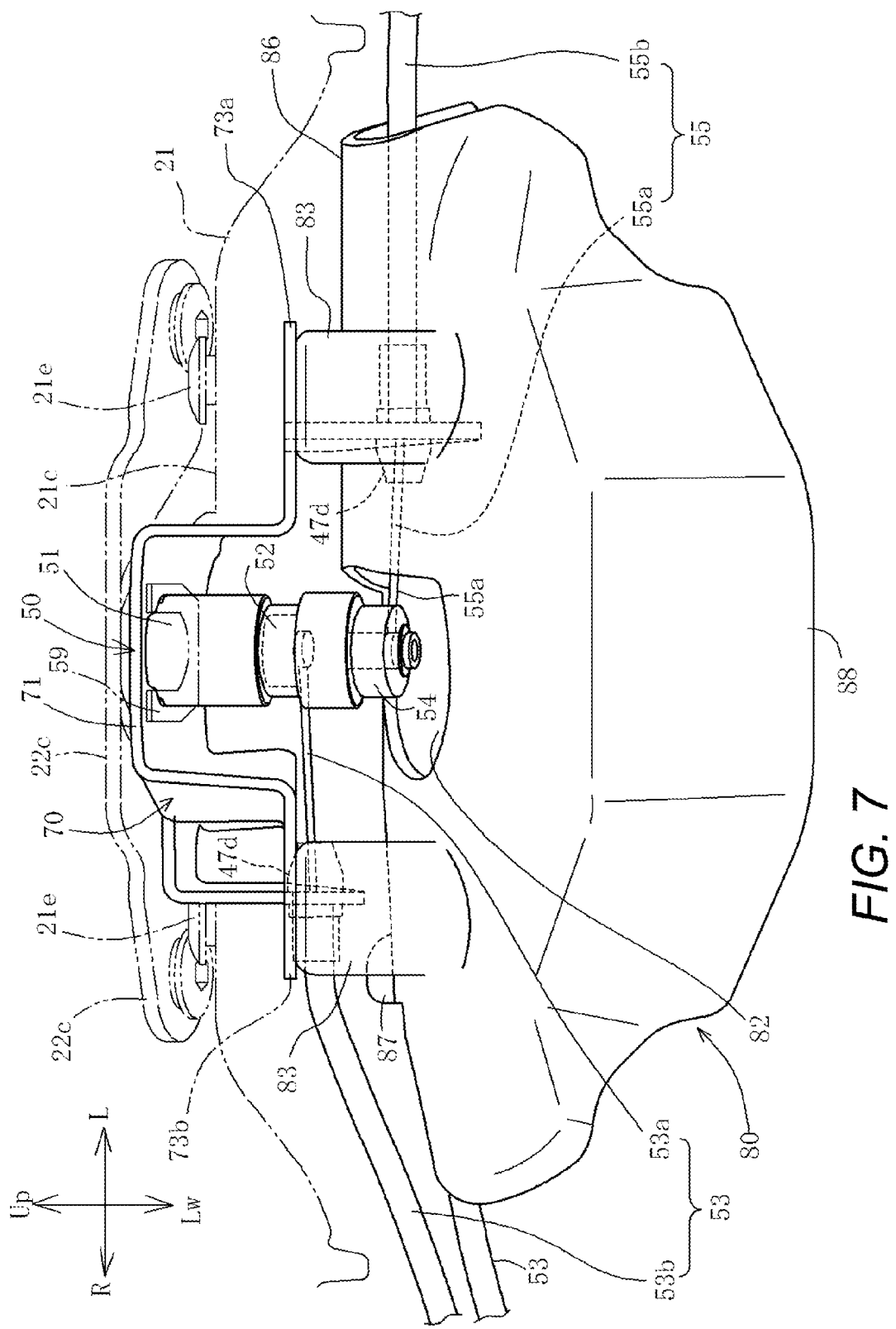
FIG. 7 is a front view of a state where the key stay and an air cleaner cover are integrated.
Figure 8:
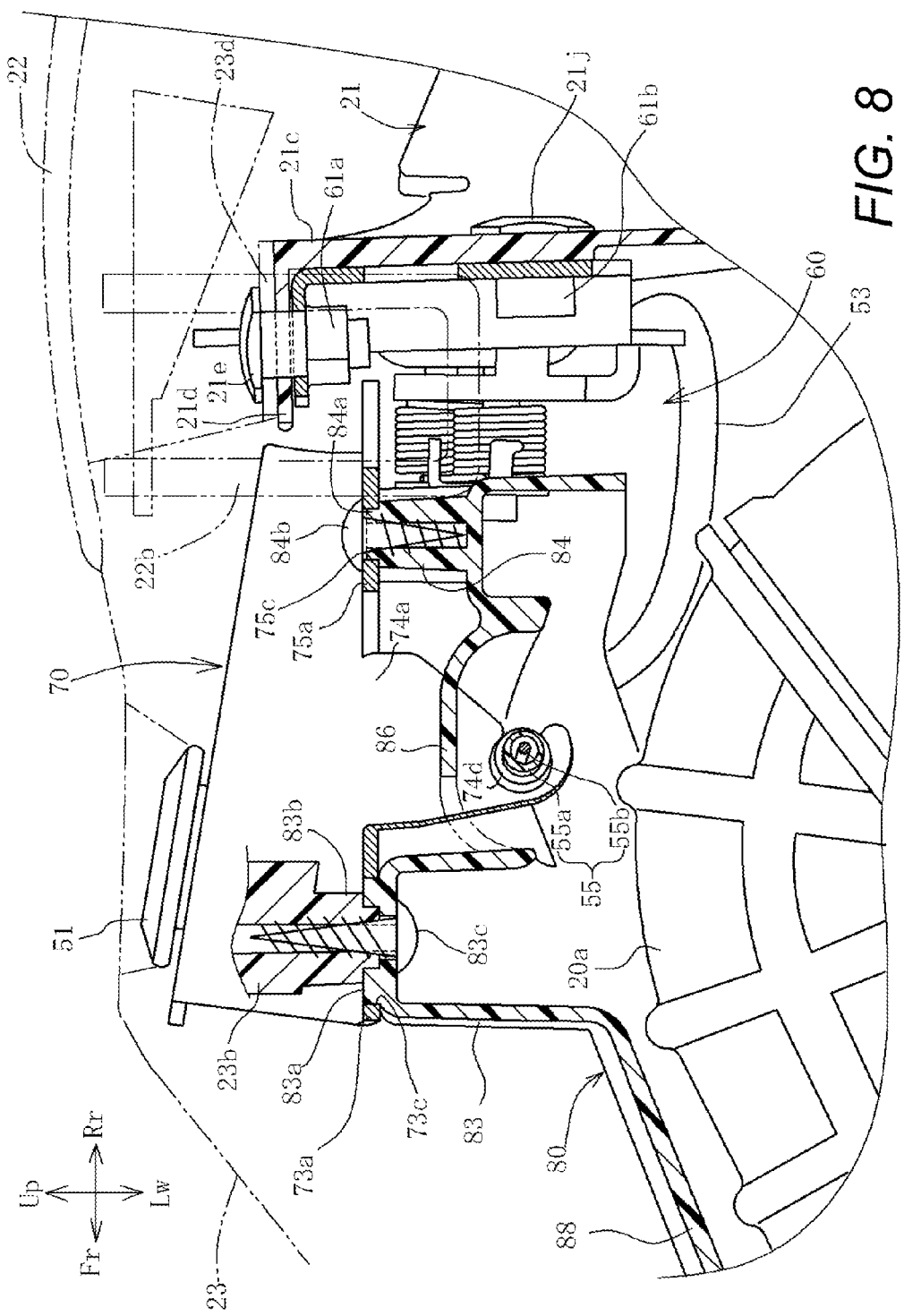
FIG. 8 is a cross-sectional view of an unlocking mechanism part (cross-sectional view taken along the line 8-8 in FIG. 4).
Figure 9:
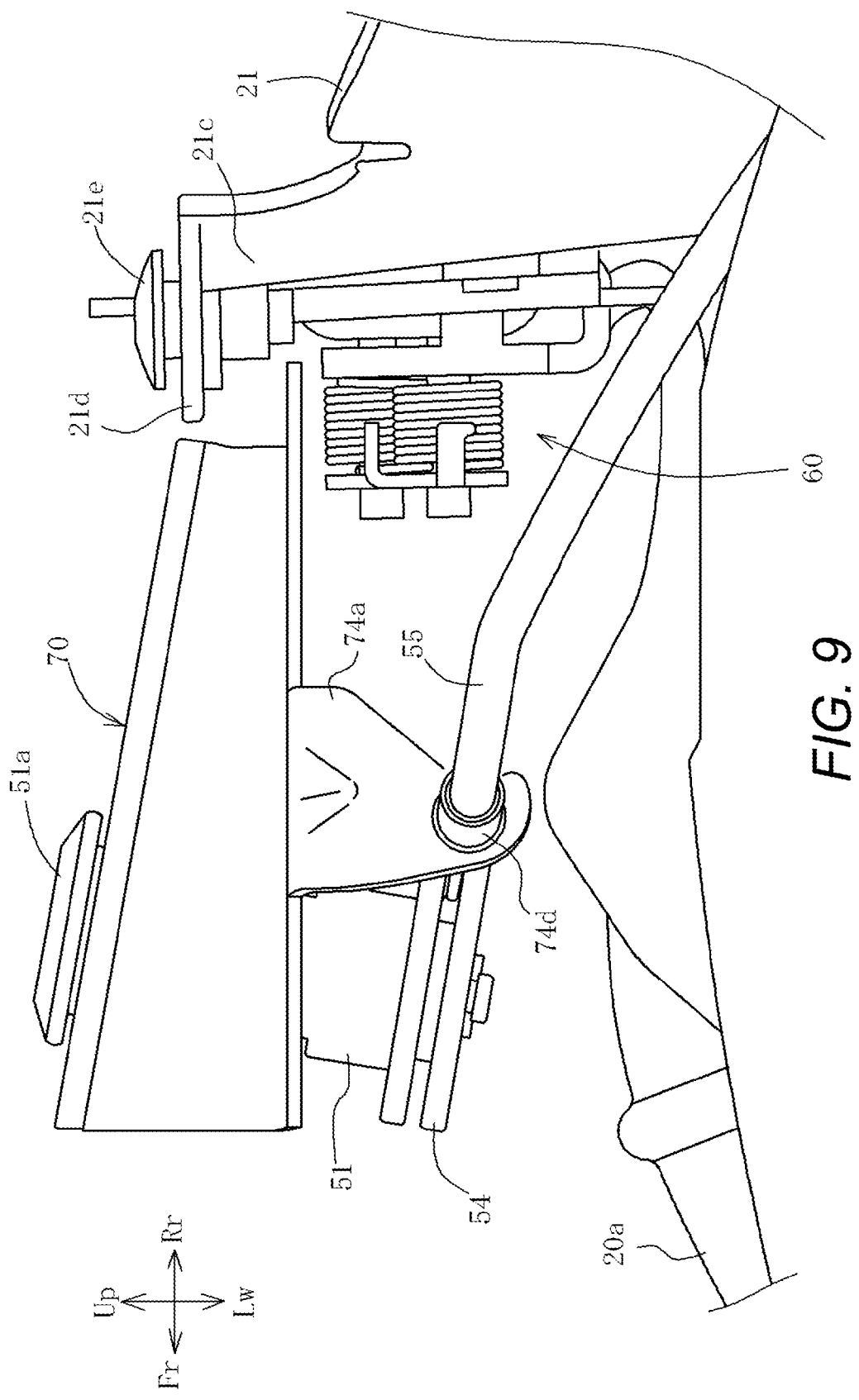
FIG. 9 is a left-side view of a main part of the unlocking mechanism part.
Figure 10:
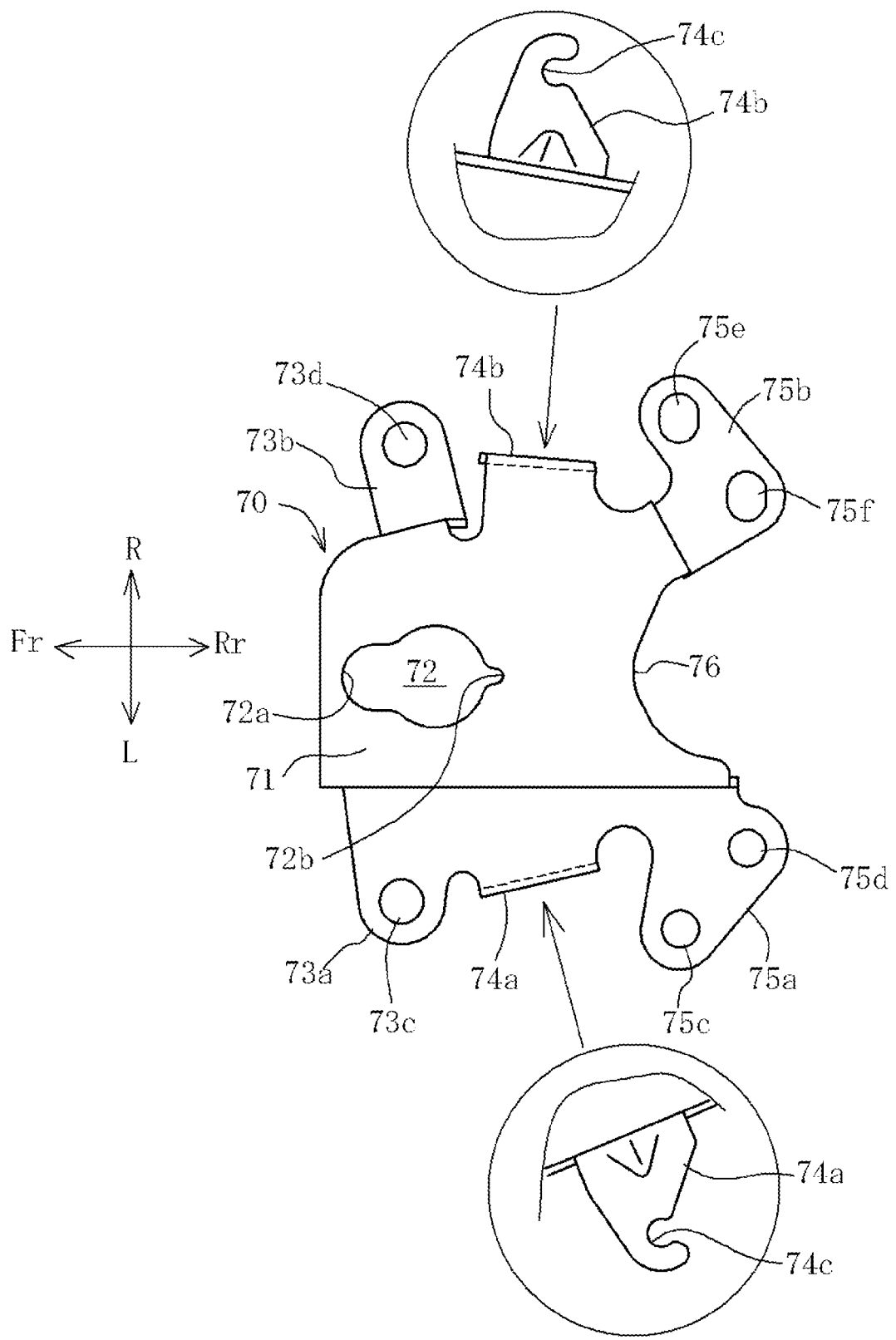
FIG. 10 is a view showing the key stay.
Figure 11:
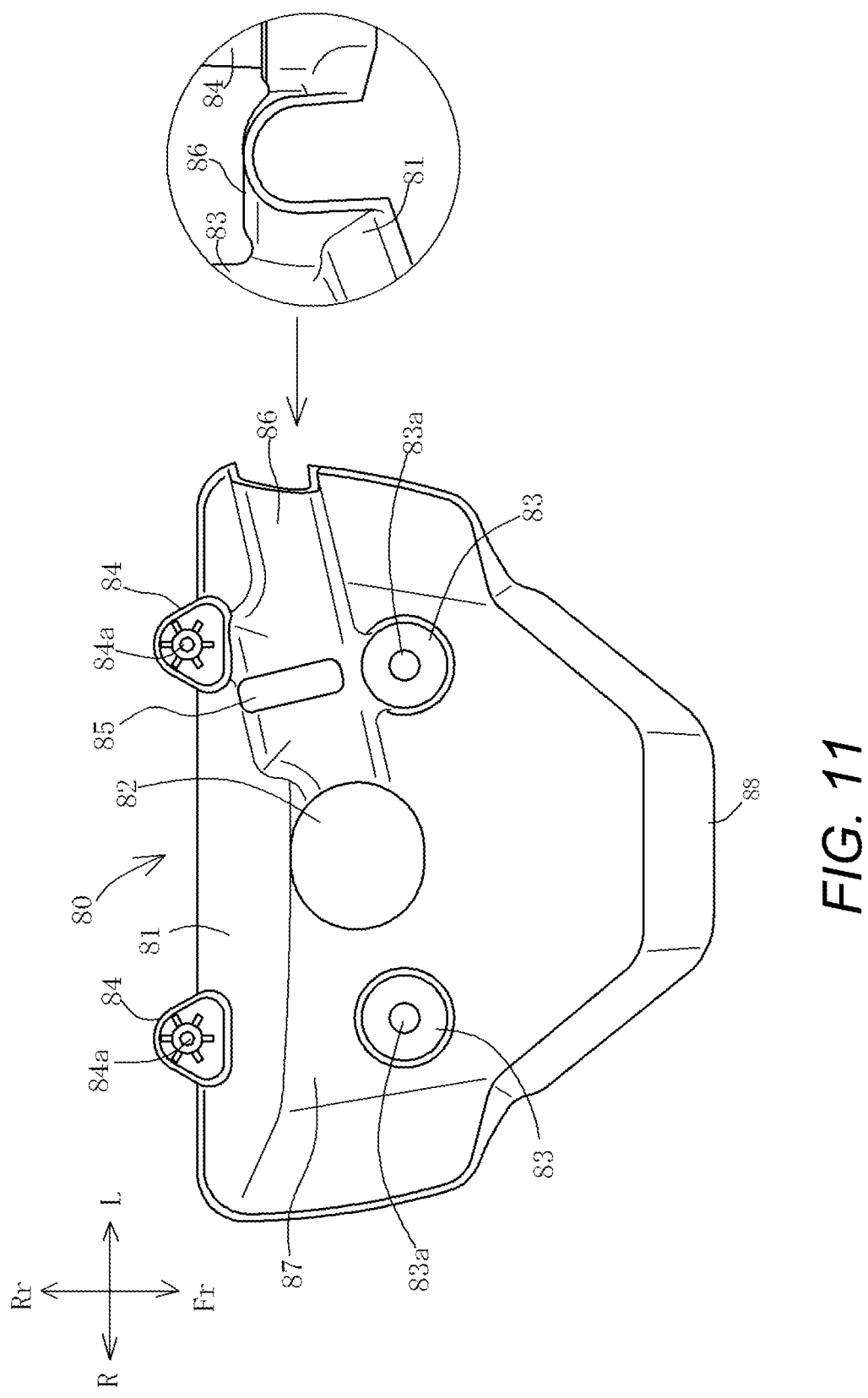
FIG. 11 is a plan view of the air cleaner cover.

FIG. 6 shows an arrangement in plane of the key stay 70 and the box-side locking mechanism 60. FIG. 7 is a front view of a state where the key stay 70 and the air cleaner cover 80 are integrated. FIG. 8 is a cross-sectional view of the unlocking mechanism 50 part taken along the line 8-8 in FIG. 4. FIG. 9 is a left-side view of a main part of the unlocking mechanism 50. FIG. 10 is a detail view of the key stay 70. FIG. 11 is a plan view of the air cleaner cover 80. Note that FIG. 6 to FIG. 10 all show a state where the front top cover 23 is omitted.

In the key stay 70, as shown in FIG. 6, the key cylinder 51 is supported to vertically penetrate at the center of a main-body portion 71 thereof. The key cylinder 51 is provided with cable coupling arm portions on the upper and lower sides as described later. One ends of an inner cable 53*a* of the box-side cable 53 and an inner cable 55*a* of the filler-side cable 55 are coupled respectively to the cable coupling arm portions.

Strictly speaking, illustrated portions of the box-side cable 53 and the filler-side cable 55 are covering tube portions, which do not move in the operation of the key cylinder 51. Key-cylinder-side end portions of the respective covering tube portions are supported by a left cable stay portion 74*a* and a right cable stay portion 74*b* provided on the left and right sides of the key stay 70.

As described above, the key stay 70 supporting the key cylinder 51 is provided with the left cable stay portion 74*a* and the right cable stay portion 74*b* on the left and right sides by which the box-side cable 53 and the filler-side cable 55 are supported. This makes it possible to use the key stay 70 also as a cable supporting member, and to thus reduce the number of components.

Portions to be pulled and thus moved by the key cylinder 51 at the time of conducting the unlocking operation are the inner cables 53*a* and 55*a* slidably passing through the insides of the covering tubes. The inner cables 53*a* and 55*a* are pulled at the time of conducting the unlocking operation and inversely move back after the unlocking operation is finished. It should be noted that, if not otherwise specified in the following description, the expression "pulling the box-side cable 53 and the filler-side cable 55" is meant to be the action of pulling the inner cables 53*a* and 55*a* at the time of conducting the unlocking operation.

In the main-body portion 71, front-side attachment arm portions 73*a* and 73*b* protrude to the left and right from the left and right sides of the front portion, the left cable stay portion 74*a* and the right cable stay portion 74*b* protrude while being bent downward from the left and right sides of the middle portion in the front-rear direction, and rear-side attachment arm portions 75*a* and 75*b* protrude to the left and right from the left and right sides of the rear end portion.

The left and right front-side attachment arm portions 73a and 73b are provided with through-holes 73c and 73d, at which the front top cover 23 and the air cleaner cover 80 are fastened together.

Through-holes 75c, 75d and 75e, 75f are formed in the left and right rear-side attachment arm portions 75a and 75b. The through-holes 75c and 75e correspond to each other, and the through-holes 75d and 75f also correspond to each other. It should be noted that the through-holes 75e and 75f on the right side are formed into long holes to absorb an attachment error.

The through-holes 75c and 75e are attachment holes for fastening to the air cleaner cover 80 while the through-holes 75d and 75f are attachment holes for fastening to the front top cover 23.

Note that the front ends of the bosses 23c of the front top cover 23 (FIG. 5) are fitted respectively into the through-holes 75d and 75f, and integrated therewith by being fastened with tapping screws (not illustrated) from below.

The rear end portions of the respective rear-side attachment arm portions 75a and 75b overlap above the left and right end portions of the box-side locking mechanism 60, respectively. In addition, a clearance portion 76 curved frontward in such a manner as to be spaced away from the box-side locking mechanism 60 is formed in the rear end portion of the main-body portion 71 between the left and right rear-side attachment arm portions 75a and 75b.

The box-side locking mechanism 60 is attached to attachment flanges 21d provided on the peripheral-edge front end portion 21c of the storage box 21 with bolts 21e. A portion between the left and right attachment flanges 21d is recessed rearward to form a clearance with the clearance portion 76 of the key stay 70. The lock fitting 22b is vertically inserted into and removed from the clearance, and the lock fitting 22b is locked by the box-side locking mechanism 60. Reference Numeral 22c denotes a main-body fitting provided integrally with the lock fitting 22b, and the main-body fitting 22c is attached to the lower surface of the front end portion of the box lid 22 in advance.

As shown in FIG. 8, the attachment flanges 21d of the storage box 21 protrude frontward at the upper end of the peripheral-edge front end portion 21c, and the box-side locking mechanism 60 is disposed therebelow, and the attachment flanges 21d are fixed by fastening the bolts 21e to nuts 61a provided to the box-side locking mechanism 60. In addition, the lower portion of the box-side locking mechanism 60 is also fastened to nuts 61b provided to the box-side locking mechanism 60 from the inside of the peripheral-edge front end portion 21c with bolts 21j. Note that, in the attachment of the box-side locking mechanism 60, the step portion 23d formed in the rear end portion of the front top cover 23 (see FIG. 5) is overlapped, and the step portion 23d is overlapped on the attachment flanges 21d with the bolts 21e inserted through the through-holes 23f, and the front top cover 23 is fastened to the box-side locking mechanism 60 and the attachment flanges 21d together by the bolts 21e and the nuts 61a.

As shown in FIG. 7, the key stay 70 is overlapped on the air cleaner cover 80 with the left and right front-side attachment arm portions 73a and 73b overlapped on bosses 83 formed integrally to protrude upward on the left and right sides of the air cleaner cover 80, and is fastened together with the front top cover 23 not illustrated here.

The together-fastening portions are fastened and joined together by fitting a protruding portion 83a of the boss 83 into the through-hole 73c provided in the front-side attachment arm portion 73a in advance, further by fitting the front end of the boss 23b formed integrally to protrude downward on the lower surface of the front top cover 23 into a depressed portion formed in the center portion of the protruding portion 83a, and then by joining the three members with the tapping screw 83c from below the inner side of the boss 83. The together-fastening portions on the right side are also joined in the same manner, and the boss 23b on the right side of the front top cover 23 (FIG. 5) and the boss 83 on the right side of the air cleaner cover 80 (FIG. 11) are fastened together at the through-hole 73d provided on the right front-side attachment arm portion 73b (FIG. 6).

When configured as described above, the key stay 70 is disposed below and attached to the front top cover 23, which is the key stay cover, and is thus not externally appeared. This makes it possible to improve the exterior appearance and to reduce the number of components and fastening portions because of the fastening together with the air cleaner cover 80, which is a component below the key stay 70.

The left and right rear-side attachment arm portions 75a and 75b provided to the key stay 70 are overlapped on and fastened to bosses 84 provided on the left and right sides of the upper surface of the rear end portion of the air cleaner cover 80 as shown in FIG. 11. As the fastened portion of the left rear-side attachment arm portion 75a with the air cleaner cover 80 is shown in cross section in FIG. 8, a protruding portion 84a of the boss 84 which is formed integrally to protrude upward on the air cleaner cover 80 is fitted into the through-hole 75c provided in the left rear-side attachment arm portion 75a of the key stay 70, and is fastened with a tapping screw 84b from above. The fastening portion on the right side is also fastened in the same manner, and is fastened to the boss 84 on the right side (FIG. 11) of the air cleaner cover 80 at the through-hole 75e (FIG. 6) provided in the right rear-side attachment arm portion 75b.

FIG. 10 is a detail view of the key stay 70, and shows a plan view of the key stay 70 at the center as well as views of the left cable stay portion 74a and the right cable stay portion 74b seen in directions indicated by arrows on the left and right sides, respectively. In this figure, each of the left cable stay portion 74a and the right cable stay portion 74b has a hook shape protruding downward, and has a groove 74c formed at the front end thereof. The front end portions of the covering tube portions of the box-side cable 53 and the filler-side cable 55 are supported by the grooves 74c with sleeves 74d (see FIG. 6) therebetween, respectively. The supporting structures of the box-side cable 53 and the filler-side cable 55 to the key cylinder 51 and the key stay 70 are the same.

The key stay 70 is formed from a metal plate by press forming or the like. An insertion hole 72 for the key cylinder 51 is formed at the center of the main-body portion 71. Part of the insertion hole 72 is provided with a small-diameter hole portion 72a protruding in the radial direction, and thus has a round keyhole-like shape.

When the key cylinder 51 is inserted through the insertion hole 72, the small-diameter hole portion 72a allows cable coupling arm portions 52 and 54 to be inserted therethrough.

A turn-preventing groove 72b is formed at a position on the opening edge portion of the insertion hole 72 on the opposite side to the small-diameter hole portion 72a. The turn-preventing groove 72b is cut in from the opening edge portion outward in the radial direction of the insertion hole 72.

The air cleaner cover 80 is made of a resin. As shown in FIG. 11, a clearance hole 82 for avoiding interference with the lower end portion of the key cylinder 51 is formed in the center of a main-body portion 81 of the air cleaner cover 80, and the bosses 83 integrally protrude upward on the left and right front sides of the clearance hole 82.

The bosses 84 are integrally formed to protrude upward on the left and right sides of the rear end portion of the main-body portion 81 behind the clearance hole 82.

A cable stay hole 85 long in the front-rear direction is formed at the left side of the clearance hole 82. This cable stay hole 85 penetrates a ridge portion 86 formed between the boss 83 and the boss 84 on the left side. The ridge portion 86 is formed in a ridge shape extending from the edge portion of the clearance hole 82 near the cable stay hole 85 to the left-side edge portion of the air cleaner cover 80. In addition, as a view in the direction indicated by an arrow is shown in an encircled portion in the figure, the ridge portion 86 has a ceiling portion curved upward in an arc shape with a lower side thereof being open.

A flat valley portion 87 is formed between the boss 83 and the boss 84 on the right side. In other words, the left and right sides of the clearance hole 82 has a level difference, that is, the ridge portion 86 is high in level and the valley portion 87 is low in level. A front portion 88 extending frontward to be long is formed at the front of the clearance hole 82, and covers above the intake duct 20a (see FIG. 8).

As shown in FIGS. 7 and 8, the left cable stay portion 74a is inserted through this cable stay hole 85, protruding below the ridge portion 86. The filler-side cable 55 is supported by the lower end portion of the left cable stay portion 74a inside the ridge portion 86, and the filler-side cable 55 is thereby routed inside the ridge portion 86.

As shown in FIG. 7, the inner cable 55a of the filler-side cable 55 passing below the ridge portion 86 is coupled to the cable coupling arm portion 54 provided in the lower end portion of the key cylinder 51.

The right cable stay portion 74b has the lower end portion located above the valley portion 87. The box-side cable 53 on the right side passes above the valley portion 87, and is supported by the right cable stay portion 74b above the valley portion 87. Then, the inner cable 53a passes at a position higher in level than the inner cable 55a and is coupled to the cable coupling arm portion 52, which is provided above the cable coupling arm portion 54, of the key cylinder 51.

As is clear from FIG. 7, the front-side attachment arm portions 73a and 73b of the key stay 70 are formed in step-shaped portions lowered in level on the left and right side than the main-body portion 71, and are each overlapped with the upper end of the boss 83 at a position higher in level than the ridge portion 86. The left cable stay portion 74a and the rear-side attachment arm portion 75a are also formed in the same step-shaped portion as that in which the front-side attachment arm portion 73a is formed. It should be noted that the left cable stay portion 74a is bent to protrude downward from the step-shaped portion, and the front end portion thereof is located below the ridge portion 86 (see FIG. 8).

On the right side of the main-body portion 71, the rear-side attachment arm portion 75b is formed in a step-shaped portion with the same height as that of the front-side attachment arm portion 73b. The right cable stay portion 74b is bent to protrude downward from the upper surface of the main-body portion 71, and the front end portion thereof reaches the vicinity of the upper surface of the valley portion 87.

With such structure, even the filler-side cable 55 on the lower side is routed at a low position, the entire air cleaner cover 80 needs not to be lowered downward. On the contrary, part of the air cleaner cover 80 is caused to protrude upward as the ridge portion 86, and then, the filler-side cable 55 is routed below the ridge portion 86. This makes it possible to arrange the key stay 70 and the air cleaner cover 80 in proximity to each other while avoiding interference with the box-side cable 53 and the filler-side cable 55, and thus to attach the cables as compact as possible.

Next, a detailed structure of the key cylinder 51 will be described with reference to FIGS. 12 and 13.

Figure 12:
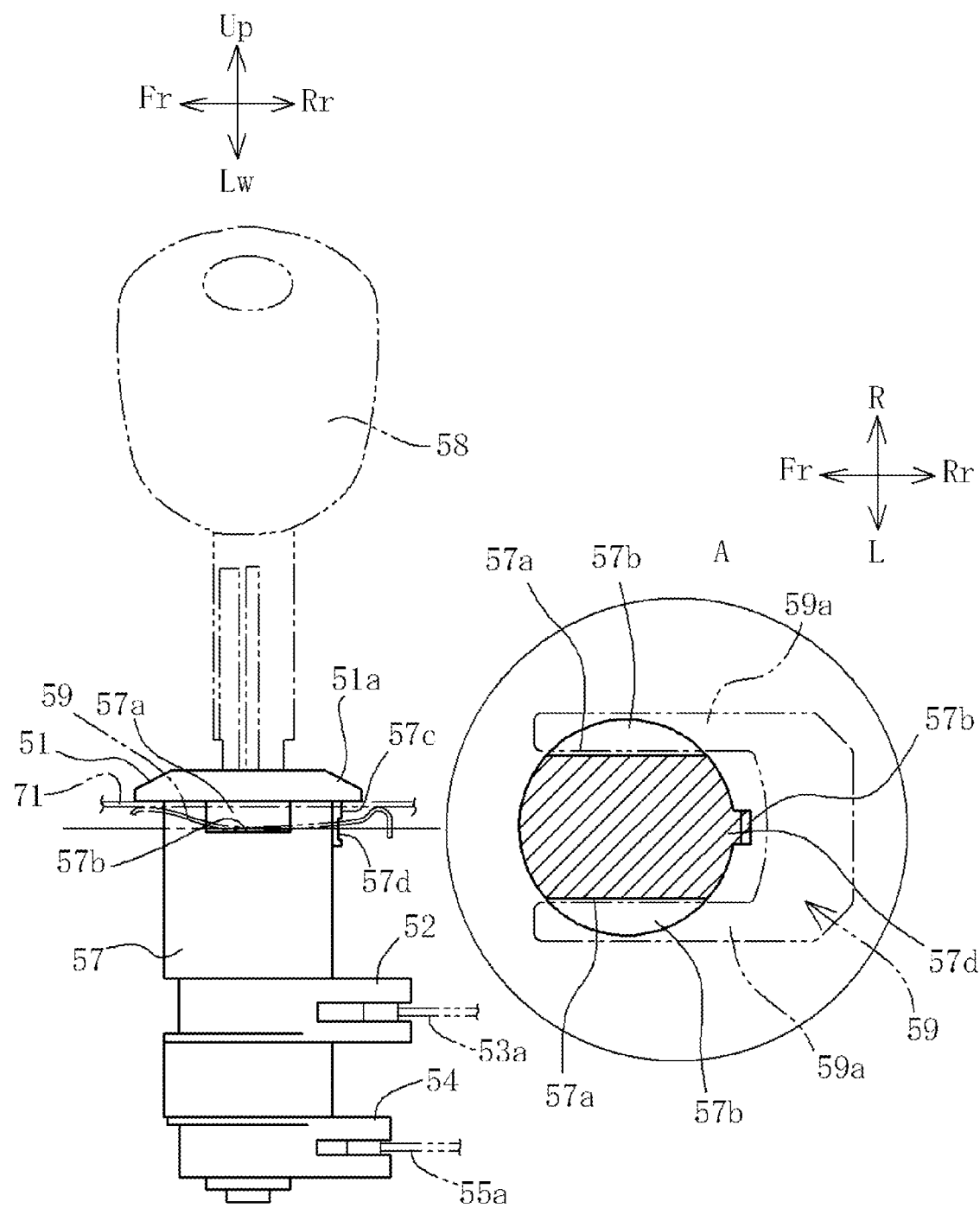
FIG. 12 is a view showing a side surface of an external shape of the key cylinder.

FIG. 12 shows an external shape of the key cylinder 51. The key cylinder 51 is provided with the cable coupling arm portions 52 and 54 on the upper and lower sides, to which the one ends of the inner cable 53a of the box-side cable 53 and the inner cable 55a of the filler-side cable 55 are coupled, respectively. The cable coupling arm portions 52 and 54 protrude outward in the radial direction of a cylindrical main-body portion 57 of the key cylinder 51. The neutral positions of the cable coupling arm portions 52 and 54, which are positions at the time of not conducting the unlocking operation, are substantially at the same position in the up-down direction.

Each of these cable coupling arm portions 52 and 54 is turned by the key 58 inserted in the key insertion hole 56 (see FIG. 5). The key 58 serves also as an ignition key used for an unillustrated ignition switch. It should be noted however that the key 58 may be a key separate from the ignition key.

The cable coupling arm portion 52 turns in association with the key 58 only when the key 58 is turned in the clockwise direction while the cable coupling arm portion 54 turns in association with the key 58 only when the key 58 is turned in the counterclockwise direction. In other words, the key cylinder 51 incorporates a lost motion mechanism which allows one of the cable coupling arm portions 52 and 54 to turn in association with the key 58 but does not allow the other one thereof to turn when the key 58 is turned in the clockwise direction or the counterclockwise direction.

A head portion 51a of the key cylinder 51 is expanded to have an umbrella shape relative to the main-body portion 57 and is formed such that the key insertion hole 56 faces from below in an opening (illustration of which is omitted) provided in conformity with the insertion hole 72 of the key stay 70 in the upper surface of the main-body portion 23a of the front top cover 23 (see FIGS. 8 and 9).

The main-body portion 57 of the key cylinder 51 has an outer diameter slightly smaller than the inner diameter of the insertion hole 72 of the key stay 70, and cut-out portions 57a are formed in the side surface of the main-body portion 57 at positions near the head portion 51a. As shown in Part A in the figure by the horizontal cross section of the main-body portion 57 passing the cut-out portions 57a, the cut-out portions 57a have a portion having a shape with a width across flat of a pair of flat surface portions formed by cutting out the opposite portions of the outer peripheral portion along parallel chords. Fixing step portions 57b are formed in the lower portions of the cut-out portions 57a with the outer peripheral portion of the main-body portion 57.

In addition, a turn-preventing protrusion 57c is formed on the side surface of the main-body portion 57 near the head portion 51a at a position displaced from each of the cut-out portions 57a substantially by 90° in the circumferential direction. This turn-preventing protrusion 57c is fitted into the turn-preventing groove 72b of the key stay 70 (see FIG. 10), and is thereby capable of preventing the key cylinder 51 from turning relative to the key stay 70. Note that, a depressed portion 57d is formed in the turn-preventing protrusion 57c. The depressed portion 57d has such a shape as being cut out in the outer peripheral side in the middle portion of the turn-preventing protrusion 57c in the up-down direction. When the depressed portion 57d is matched with the edge portion of the insertion hole 72 in the key stay 70, the key cylinder 51 can be turned in the insertion hole 72 about the axis thereof. In other words, the insertion hole 72 is formed to be larger than the outer diameter of the main-body portion 57 approximately by the distance of protrusion of the bottom portion in the depressed portion 57d.

The key cylinder 51 can be attached to the key stay 70 as follows. First, the key cylinder 51 is inserted into the insertion hole 72 with the cable coupling arm portions 52 and 54 each facing frontward, and the cable coupling arm portions 52 and 54 are each caused to pass through the small-diameter hole portion 72a. Thereafter, the key cylinder 51 is turned substantially by 180° in a state where the depressed portion 57d is matched with the edge portion of the insertion hole 72, thereby matching the position of the turn-preventing protrusion 57c with the key stay 70, and then is fixed by a fixing spring 59.

The fixing spring 59 is made of a plate spring having a substantially squared U-shape in a plan view. The width between arm portions 59a thereof extending in parallel on the left and right sides is approximately the same as the width between the left and right cut-out portions 57a of the main-body portion 57 of the key cylinder 51. Each of the left and right arm portions 59a has an end portion in the front-rear direction which extends obliquely upward and has a middle portion in the front-rear direction which is curved downward. The state of the fixing spring 59 before attachment is such that the difference in level between the end portion in the front-rear direction and the middle portion in the front-rear direction is greater than the distance between the lower surface of the head portion 51a and each fixing step portion 57b.

Then, when the fixing spring 59 is thrust to the main-body portion 57 of the key cylinder 51 from the rear in a direction orthogonal to the axis with the portion open between the left and right arm portions 59a located in front, the left and right cut-out portions 57a of the main-body portion 57 enter between the left and right arm portions 59a, and the middle portions in the front-rear direction of the left and right arm portions 59a come into contact with, and thus presses downward, the fixing step portions 57b while the end portions in the front-rear direction come into contact with, and thus presses upward, the lower surface of the main-body portion 71 of the key stay 70. Accordingly, the key cylinder 51 is fixed by the fixing spring 59 pressing the fixing step portions 57b downward to press the head portion 51a against the upper surface of the main-body portion 57 of the key cylinder 51. At this time, the turn-preventing protrusion 57c is fitted into the turn-preventing groove 72b of the key stay 70, so that the key cylinder 51 is prevented from turning.

Figure 13:
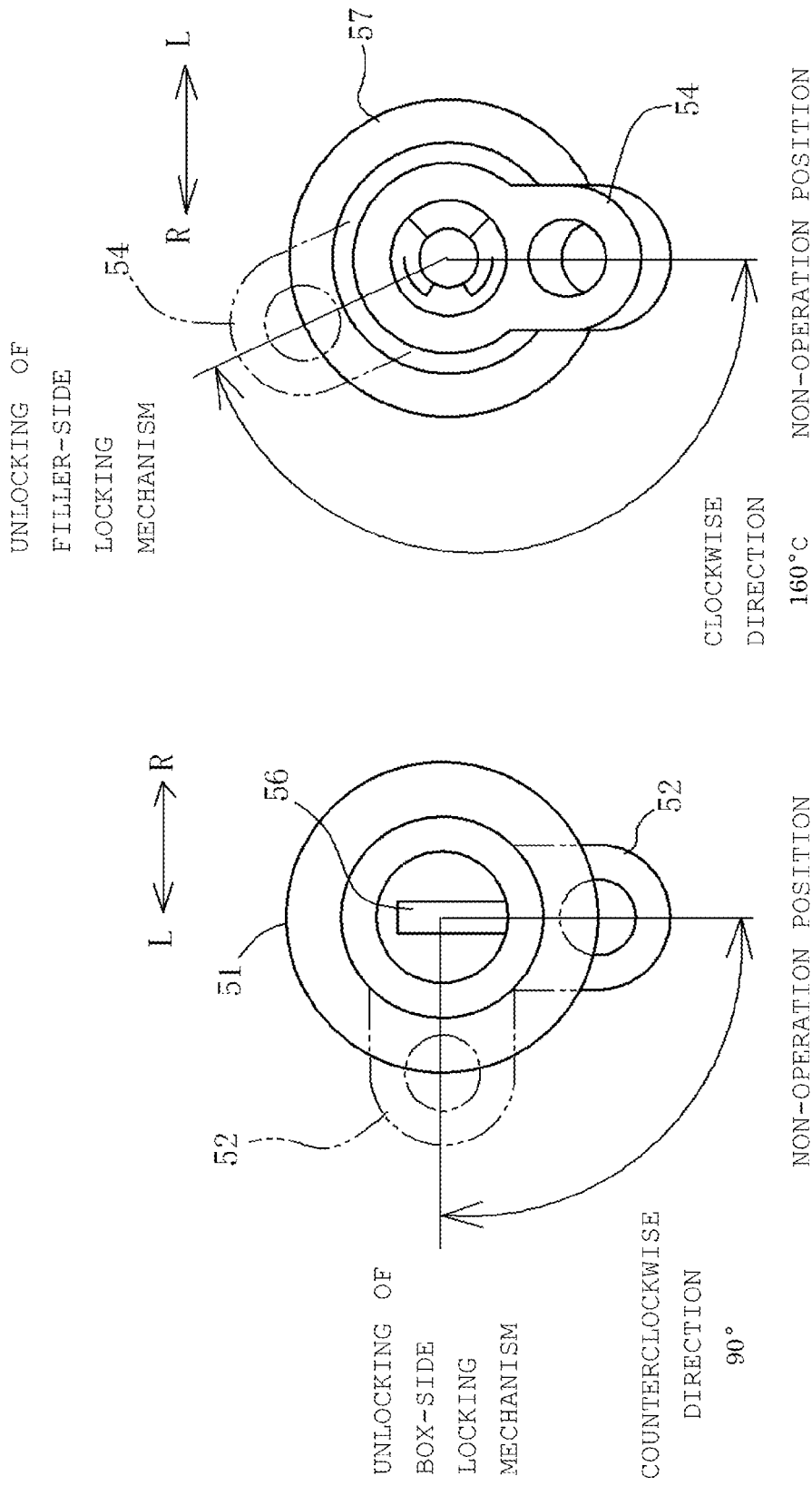
FIG. 13 is a view showing an action of the key cylinder.

FIG. 13 is a view showing the action of the key cylinder 51, Part A shows the action against the box-side cable 53 when the key cylinder 51 is seen from above in FIG. 12 while Part B shows the action against the filler-side cable 55 when the key cylinder 51 is seen from below in FIG. 12. As shown in these figures, although the box-side cable 53 is coupled to the cable coupling arm portion 52 and the filler-side cable 55 is coupled to the cable coupling arm portion 54, each of these cables operates in conjunction with only the turning of the key cylinder 51 in one direction.

Specifically, as shown in Part A of FIG. 13, the cable coupling arm portion 52 integrally turns only when the key cylinder 51 turns clockwise from a non-operation position (a position where the key can be removed). When turning substantially by 90°, the cable coupling arm portion 52 starts to pull the box-side cable 53 to the left, thereby unlocking the box-side locking mechanism 60. When turning in the opposite direction, the key cylinder 51 is not activated to be in lost motion.

Note that the non-operation position is a position of the key insertion hole 56 when the unlocking operation is not performed by using the key 58. After the unlocking operation using the key 58, each cable (53, 55) is pulled back toward the upper side of the corresponding locking mechanism (60, 90), thereby causing the key insertion hole 56 to return to the non-operation position, where the key 58 can be removed from the key insertion hole 56.

As shown in Part B of FIG. 13, the cable coupling arm portion 54 integrally turns only when the key cylinder 51 turns clockwise. When turning substantially by 160°, the cable coupling arm portion 54 starts to pull the filler-side cable 55 to the right, thereby unlocking the filler-side locking mechanism 90. When turning in the opposite direction, the key cylinder 51 is not activated to be in lost motion.

Note that, Part B of the figure shows a state turned upside down, and accordingly, when the key cylinder 51 is seen from above in FIG. 12 as in the case of Part A of the figure, the cable coupling arm portion 54 turns counterclockwise at the time of conducting the unlocking operation.

With the above-described configuration, turning the key cylinder 51 clockwise or counterclockwise can causes the unlocking operation selectively for each of the box-side locking mechanism 60 and the filler-side locking mechanism 90. Providing the unlocking mechanism 50 of the embodiment as described above eliminates the necessity of providing unlocking mechanisms separately for the locking mechanisms, and thus makes it possible to make the device more compact.

In addition, both of the box-side locking mechanism 60 and the filler-side locking mechanism 90, which are two locking mechanisms arranged separately at the front and rear of the rider seat 30, can be unlocked by using the single unlocking mechanism 50 having the common key cylinder 51. Accordingly, the box lid 22 and the pillion seat 31 (filler lid), which are two lids arranged separately, can be unlocked with the configuration low in cost and relatively simple in structure with a smaller number of components. Moreover, such single unlocking mechanism 50, which is capable of operating two locking mechanisms in common, can be arranged in a space-efficient manner at the rear of the head pipe 11 and at the front of the storage box 21.

Next, the box-side locking mechanism 60 will be described on the basis of FIGS. 14 to 16.

Figure 14:
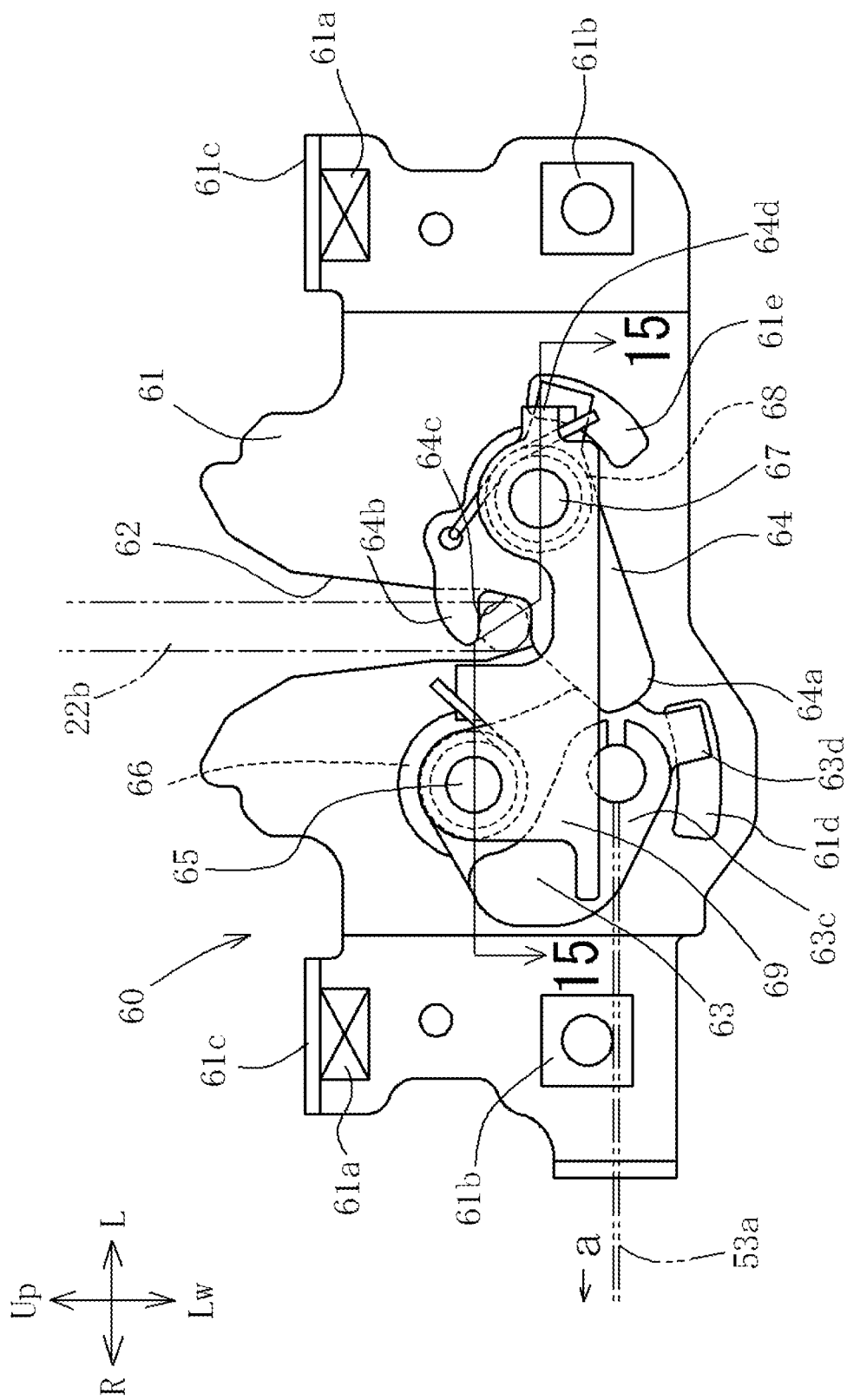
FIG. 14 is a view showing the box-side locking mechanism from a front side.

FIG. 14 is a view showing the box-side locking mechanism 60 from the front side. FIG. 15 is a cross-sectional view taken along the line 15-15 in FIG. 14. FIG. 16 is an explanatory view of the operation thereof.

The box-side locking mechanism 60 includes a base plate 61 having a slot 62 formed therein as well as a first lever 63 and a second lever 64 arranged with the slot 62 therebetween.

The base plate 61 is attached to the attachment flanges 21d with the bolts 21e at the weld nuts 61a provided on the lower surface of a flange 61c formed by bending the upper end of the base plate 61 frontward substantially in the horizontal direction. In addition, the base plate 61 is provided with the nuts 61b also on the lower surface thereof, and is attached to the front surface of the peripheral-edge front end portion 21c of the storage box 21 with the bolts 21j (see FIG. 8). The slot 62 is a groove extending in the up-down direction and open upward for enabling the lock fitting 22b to be inserted and removed therethrough.

The first lever 63 is turnably attached to the base plate 61 with a support shaft 65, and is biased to turn in the counterclockwise direction by a coil spring 66. The second lever 64 is turnably supported to the base plate 61 by a support shaft 67, and is biased to turn in the clockwise direction by a coil spring 68. Each of the first lever 63 and the second lever 64 has almost a shape of a sector, and is turnably supported by the corresponding support shaft at a position displaced toward the end portion corresponding to the center of the sector.

The state shown in FIG. 14 is a locked state. An engagement end portion 64a provided to the front end portion of the second lever 64 is engaged with an engagement step portion 63a provided to the first lever 63, preventing the second lever 64 from turning in the clockwise direction, and the lock fitting 22b is locked by an engagement protruding portion 64b, thus being incapable of moving upward.

The turning of the first lever 63 is restricted by a protruding portion 63d of the first lever 63, which has entered a first guide groove 61d formed in the base plate 61, coming into contact with the end portion of the first guide groove 61d.

The first guide groove 61d is formed in an arc shape long in the left-right direction in the lower portion of the base plate 61 in such a manner as to allow the turning of the protruding portion 63d, which turns together with the first lever 63. When the protruding portion 63d comes into contact with an inner end portion (an end portion on the second lever 64 side) of the first guide groove 61d, the first lever 63 is prevented from turning at the time of not conducting the unlocking operation. When the protruding portion 63d comes into contact with an outer end portion (an end portion opposite to the inner end portion), the first lever 63 is prevented from turning at the time of conducting the unlocking operation.

The one end of the inner cable 53a of the box-side cable 53 is in engagement, near the protruding portion 63d, with the outer peripheral portion of the first lever 63. Pulling the inner cable 53a in the direction indicated by the arrow a at the time of conducting the unlocking operation causes the first lever 63 to turn in the clockwise direction against the coil spring 66. The engagement step portion 63a is formed, near the protruding portion 63d, in the edge portion on the second lever 64 side of the first lever 63.

The turning of the second lever 64 is restricted by a protruding portion 64d of the second lever 64d, which has entered a second guide groove 61e formed in the base plate 61, coming into contact with the end portion of the second guide groove 61e. The second guide groove 61e is formed in an arc shape long obliquely in the up-down direction in the lower portion of the base plate 61 in such a manner as to allow the turning of the protruding portion 64d, which turns together with the second lever 64. Causing the protruding portion 64d to come into contact with the upper end portion of the second guide groove 61e prevents the second lever 64 from excessively turning at the time of conducting the locking operation. Causing the protruding portion 64d to come into contact with the lower end portion prevents the second lever 64 from turning at the time of conducting the unlocking operation.

The engagement protruding portion 64b is a protruding portion to be inserted into and removed from the slot 62 to be engaged with and disengaged from the lock fitting 22b in association with the turning of the second lever 64. The engagement protruding portion 64b is configured to be protruded into the slot 62 at the time of locking and removed out of the slot 62 at the time of unlocking.

An engagement recess portion 64c is formed below the engagement protruding portion 64b, and the lower portion of the lock fitting 22b is configured to be engaged with the engagement recess portion 64c.

Figure 15:
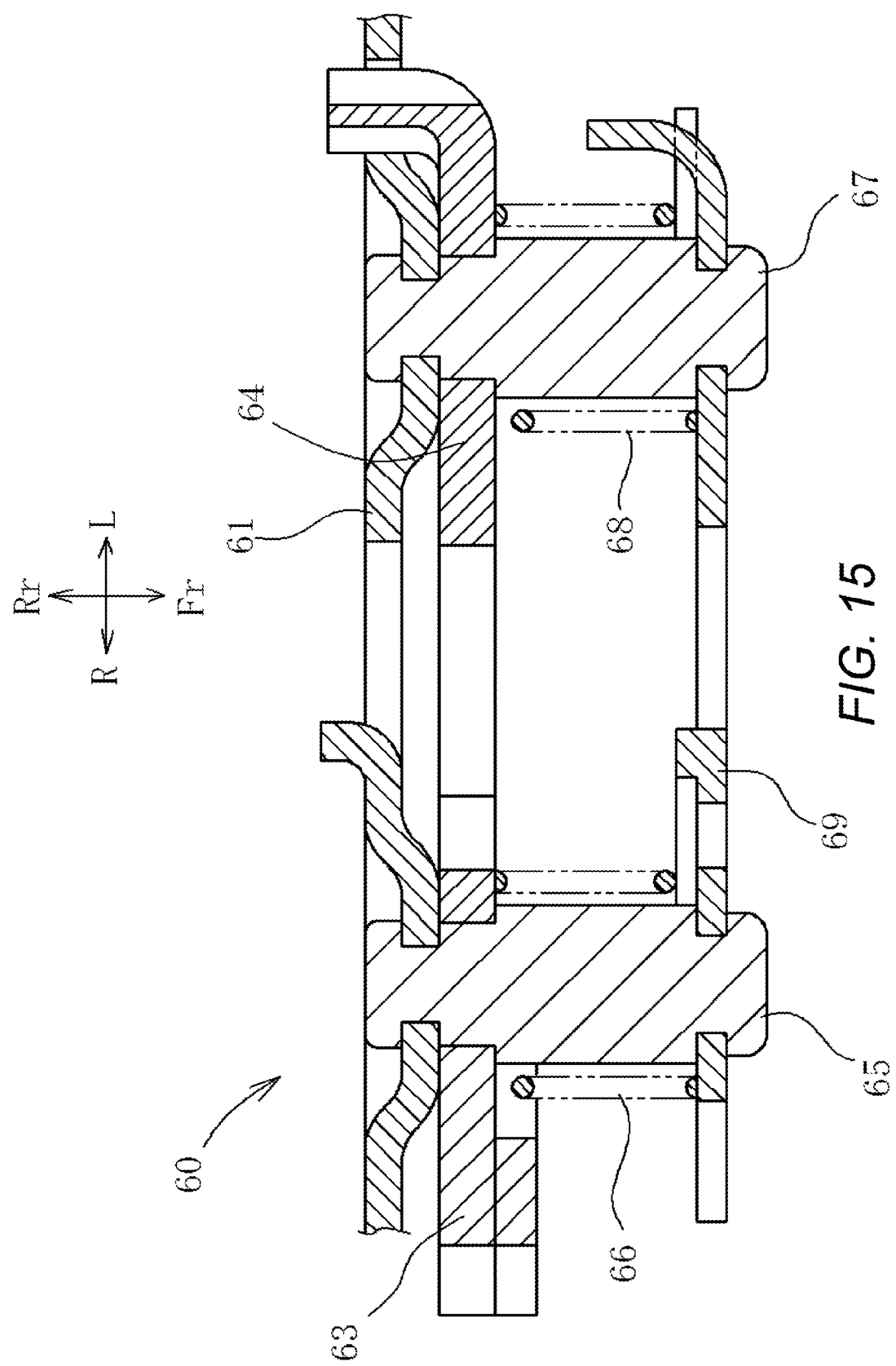
FIG. 15 is a cross-sectional view taken along the line 15-15 in FIG. 14.

In FIG. 15, Reference Numeral 69 denotes a holding plate, which holds the coil springs 66 and 68, and one end of each of the coil springs 66 and 68 is locked with the holding plate 69. The other ends of the coil springs 66 and 68 are locked with the first lever 63 and the second lever 64, respectively.

The entire box-side locking mechanism 60 is assembled as follows. One ends of the support shafts 65 and 67 are attached to the base plate 61. The first lever 63 and the coil spring 66 are attached to the support shaft 65. The second lever 64 and the coil spring 68 are attached to the support shaft 67. Further, the other ends of the support shafts 65 and 67 are inserted through through-holes provided in the holding plate 69. Then, both ends of the support shafts 65 and 67 are riveted. This makes the thickness of the box-side locking mechanism 60 to be almost equal to those of the coil springs 66 and 68, making the box-side locking mechanism 60 generally thin, to obtain a simple structure, and to facilitate the manufacture.

The operation of the box-side locking mechanism 60 will be described with reference to FIG. 16. Note that FIG. 16 is for explaining the actions of the first lever 63 and the second lever 64 in principle, and the slot 62, the coil springs 66 and 68, and the like are omitted.

Figure 16A:
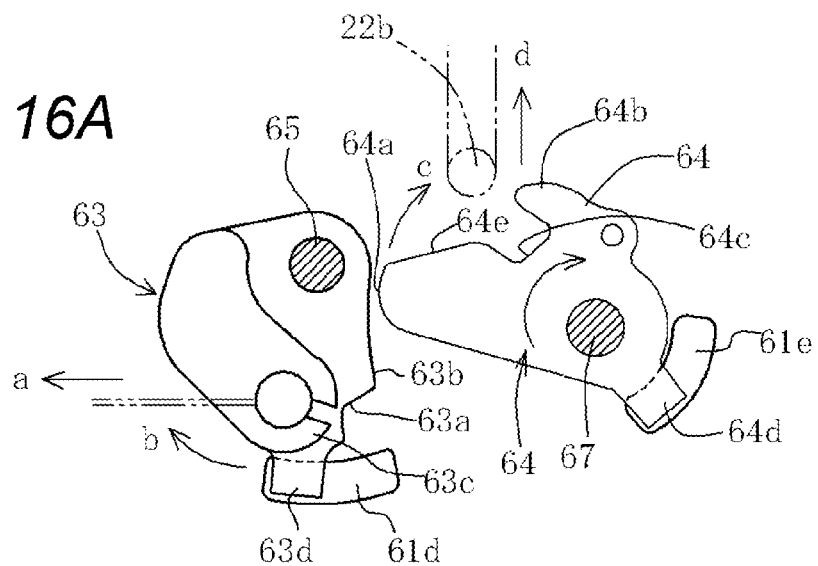
FIG. 16 is an explanatory view of an operation of the box-side locking mechanism.
Figure 16B:
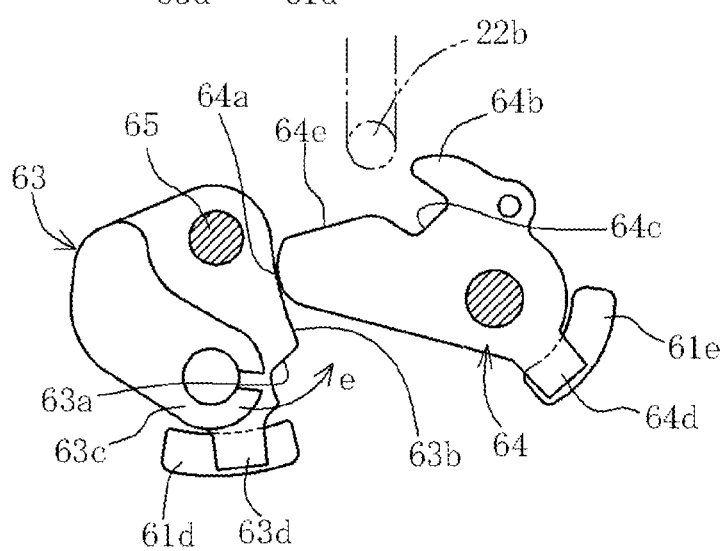
Figure 16C:
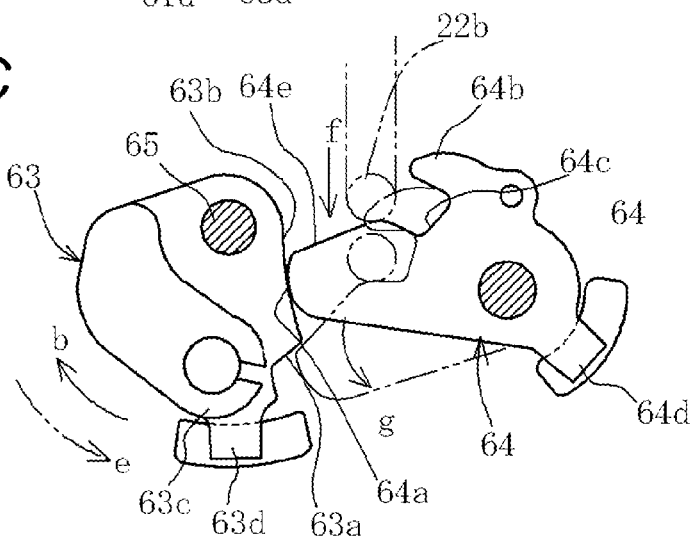

Part A of FIG. 16 shows the time of conducting the unlocking operation. In the locked state in FIG. 14, pulling the inner cable 53a in the direction indicated by the arrow a causes the first lever 63 to turn in the clockwise direction (direction indicated by the arrow b) against the coil spring 66, so that the engagement step portion 63a is removed from the engagement end portion 64a. Accordingly, the second lever 64 is released from the engagement of the first lever 63, and is caused to turn in the clockwise direction (direction indicated by the arrow c) by the coil spring 68, causing the engagement protruding portion 64b to be disengaged from the lock fitting 22b and removed out of the slot 62. The engagement recess portion 64c thus faces upward, releasing the lock fitting 22b and allowing the lock fitting 22b to move upward in the direction indicated by the arrow d. This state is the unlocked state of the box lid 22 in which the box lid 22 can be opened.

Part B of FIG. 16 shows a state where, after the unlocking operation, the key 58 is returned to the non-operation position (see Part A of FIG. 13). In this state, since the inner cable 53a is not being pulled, the first lever 63 is caused to turn in the counterclockwise direction (direction indicated by the arrow e) by the coil spring 66. However, the engagement end portion 64a of the second lever 64 is in sliding contact with a portion of an edge portion 63b of the first lever 63, which is closer to the turning center than to the engagement step portion 63a. For this reason, even when pressed from the first lever 63 side, the second lever 64 is not pressed back in the counterclockwise direction (direction indicated by the arrow g in Part C) and thus keeps the turned posture in the unlocked state.

At this time, the engagement recess portion 64c is also at a position out of the slot 62, and an edge portion 64e of the second lever 64 is located directly below the lock fitting 22b. The edge portion 64e is located between the engagement end portion 64a and the engagement recess portion 64c, and has a surface inclined obliquely downward toward the first lever 63.

Part C of FIG. 16 shows a starting phase of the locking operation. In the state of Part B of FIG. 16, when the box lid 22 is closed to thrust the lock fitting 22b into the slot 62 from the upper side to the lower side (in the direction indicated by the arrow f), the lock fitting 22b presses the edge portion 64e downward, which causes the second lever 64 to turn in the counterclockwise direction (direction indicated by the arrow g) against the coil spring 68. The turning causes the engagement protruding portion 64b and the engagement recess portion 64c to enter the slot 62. Accordingly, the lock fitting 22b enters the engagement recess portion 64c, the engagement protruding portion 64b is thus engaged with the lock fitting 22b, so that the lock fitting 22b becomes incapable of being disengaged.

At this time, the engagement end portion 64a slides on the edge portion 63b of the first lever 63, that is, slides toward the engagement step portion 63a while once causing the first lever 63 to turn in the clockwise direction (direction indicated by the arrow b). Then, once the engagement end portion 64a enters the engagement step portion 63a, the first lever 63 is again caused to turn in the counterclockwise direction (direction indicated by the arrow e) by the coil spring 66, so that the engagement step portion 63a is engaged with the engagement end portion 64a to prevent the second lever 64 from turning in the clockwise direction (direction indicated by the arrow c in Part A). This state is that shown in FIG. 14, which is the locked state of the box lid 22.

Next, the filler-side locking mechanism 90 will be described on the basis of FIGS. 17 to 22.

Figure 17:
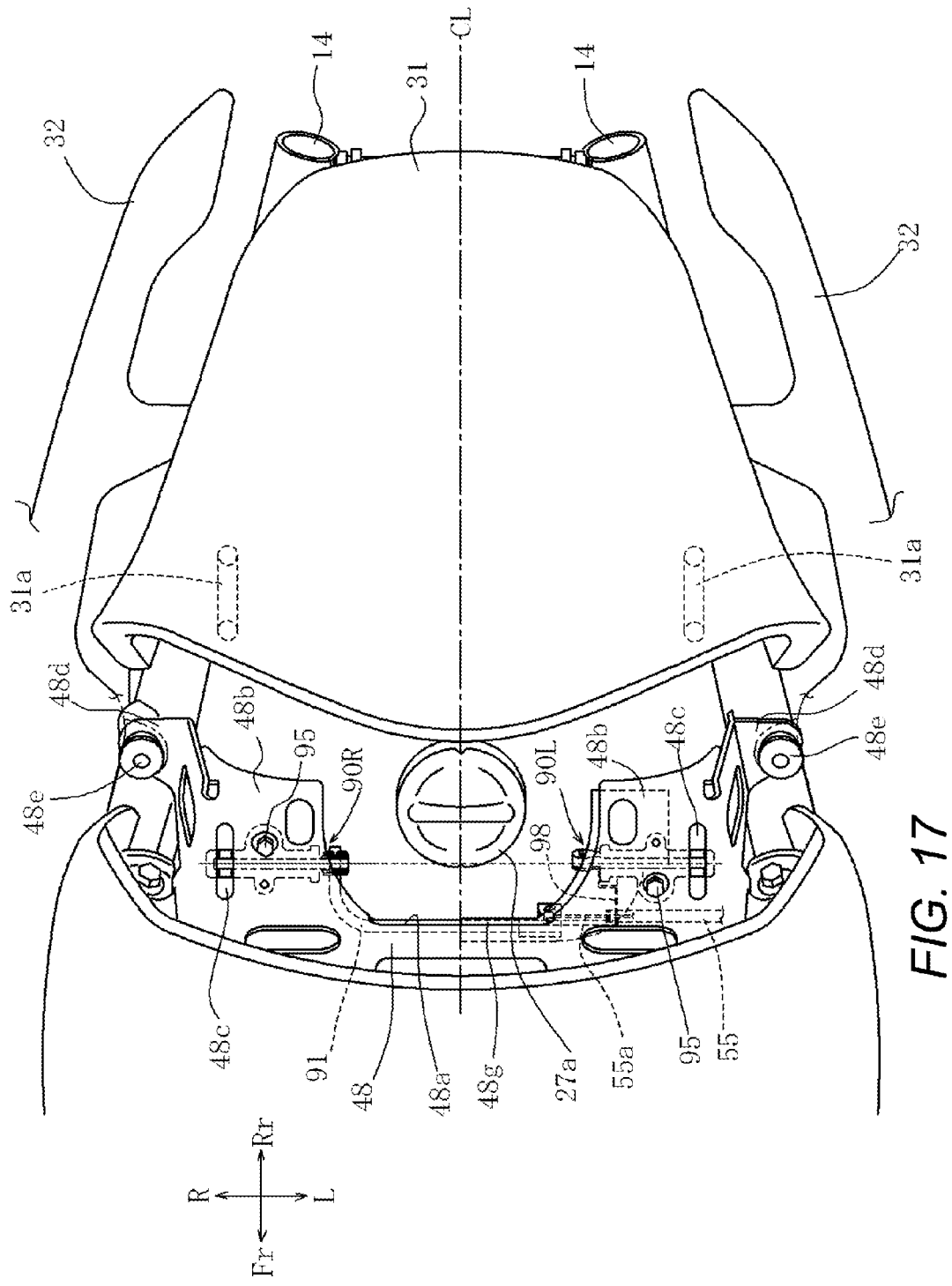
FIG. 17 is a plan view of a state where a pillion seat is opened.
Figure 18:
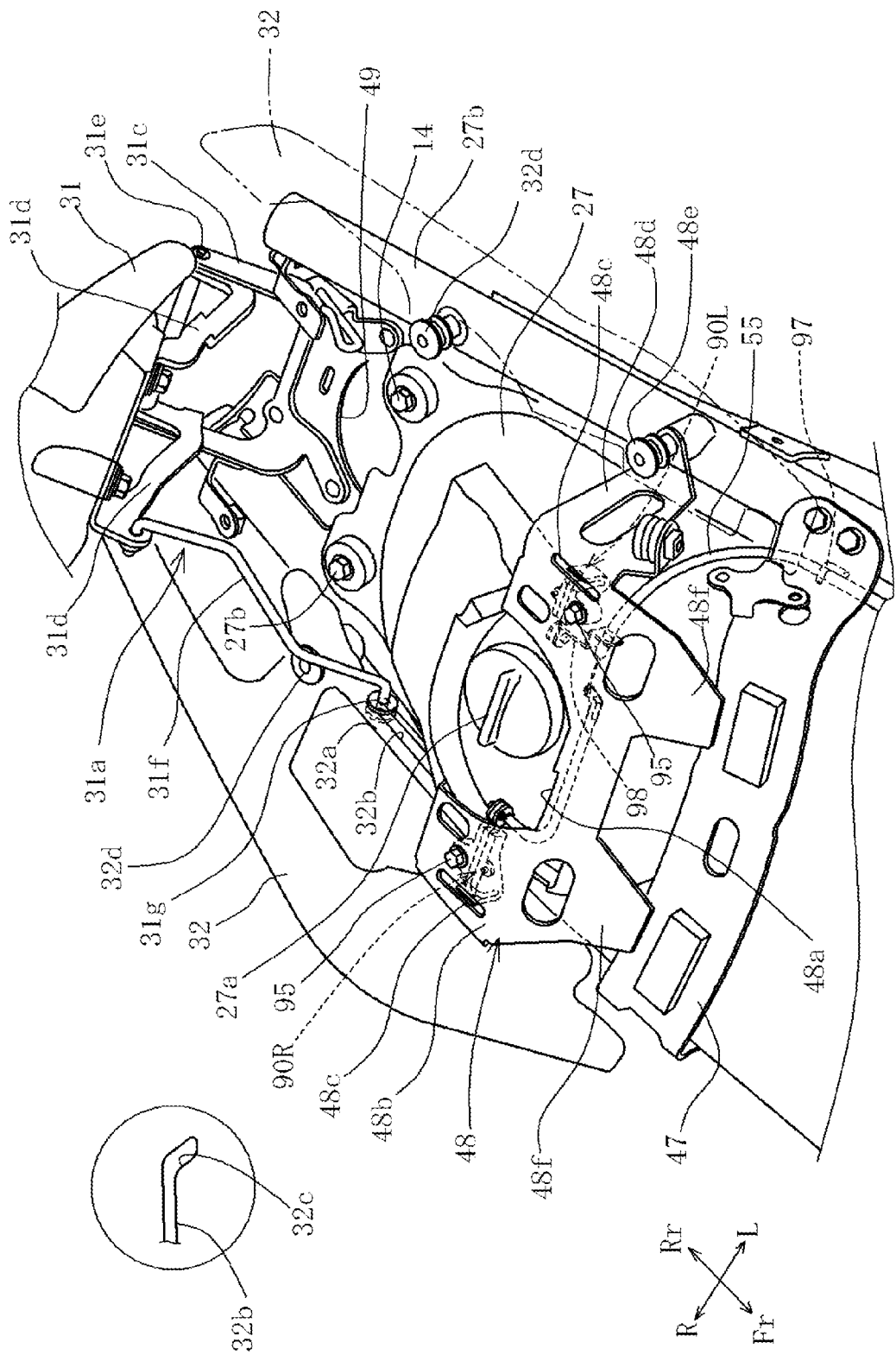
FIG. 18 is a perspective view of the above state.

FIG. 17 is a plan view of a state where the pillion seat 31 is opened. FIG. 18 is a perspective view of the fuel tank side in the state. In these figures, in the state where the pillion seat 31 is opened, the filler cap 27a attached to the fuel filler of the fuel tank 27 is exposed to the outside through a clearance portion 48a that is a concave portion curving frontward formed in the center portion of the locking-portion cross plate 48, and accordingly, removing the filler cap 27a enables fueling.

The locking-portion cross plate 48 has a center portion rising upward to straddle the fuel tank 27. Hook holes 48c each formed in a groove long in the front-rear direction are provided in left and right side portions 48b on the two sides of sandwiching the clearance portion 48a. The hook holes 48c are provided in pair on the left and right sides, and are configured to accommodate lock fittings 31b each having a substantially squared U-shape (see FIG. 3), which are then locked by a pair of right and left filler-side locking mechanisms 90R and 90L arranged respectively below the right and left side portions 48b.

The lock fittings 31b are fittings each having a squared U-shape facing upward in a side view when the pillion seat 31 is closed, and are provided to protrude downward on the left and right sides of the lower surface of the front portion of the pillion seat 31.

The right and left filler-side locking mechanisms 90R and 90L are operated to be unlocked simultaneously by the filler-side cable 55. The filler-side cable 55 led to the rear of the vehicle body from the key cylinder 51 enters a lower side of the locking-portion cross plate 48, and there coupled to the right and left filler-side locking mechanisms 90R and 90L.

An outer cable 55b of the filler-side cable 55 is fixed on the vehicle-body frame side by a clamp 97 below the left end portion of the cross plate 47.

Note that, regarding the filler-side locking mechanism 90, when it is necessary to distinguish the left and right mechanisms for the convenience of description, the left one and the right one are distinguished with Reference Numeral 90R and Reference Numeral 90L, respectively. In FIGS. 17 to 20 and FIG. 22, which will be referred to later, the left and right mechanisms are distinguished to be displayed, and will be distinguished also in the following description.

Left and right end portions 48d of the locking-portion cross plate 48 are bent downward and attached onto the seat rails 14 with bolts 48e. In addition, a front end portion 48f is also bent downward and welded onto the cross plate 47.

The grab rails 32 are attached at the front and rear portions to the seat rails 14 with the bolts 48e and bolts 32d. The rear end of the fuel tank 27 is attached to a cross plate 49 with bolts 27b. The attachment with the bolts 48e is the fastening together with the locking-portion cross plate 48.

The hinge mechanism 31a provided on the rear end portion of the pillion seat 31 includes a hinge portion and a hinge stay 31. The hinge portion is formed by turnably coupling vehicle-body-side hinge arms 31c and seat-side hinge arms 31d with a hinge shaft 31e. The vehicle-body-side hinge arms 31c have lower ends attached to the cross plate 49 laid between the rear end portions of the seat rails 14, and stand obliquely upward to the upper side. The seat-side hinge arms 31d have one ends attached to the rear end of the bottom portion of the pillion seat 31. The hinge stay 31f has one end coupled to the front end portion of the seat-side hinge arm 31d on the right side of the vehicle body.

The other end of the hinge stay 31f is formed in a sliding portion 31g engaged with a long groove 32b which is formed in a portion 32a of the grab rail 32 near the seat rail 14, and is long in the front-rear direction.

As shown in the encircled portion in FIG. 18, a locking groove 32c inclined obliquely downward to the rear is formed continuously in the rear end of the long groove 32b.

When the pillion seat 31 is opened, the sliding portion 31g slides rearward on the long groove 32b, falls into the locking groove 32c, and comes into contact with the rear end (lower end) of the locking groove 32c. At this event, the pillion seat 31 becomes in an upright posture, restricts the sliding portion 31g so that the sliding portion 31g should not unintentionally get out of the locking groove 32c and move frontward on the long groove 32b, and thereby, the pillion seat 31 maintains the open state.

The pillion seat 31 is closed as follows. The sliding portion 31g is manually moved out of the locking groove 32c to the horizontal portion of the long groove 32b. Thereafter, pushing out the pillion seat 31g frontward causes the sliding portion 31g to slide frontward on the long groove 32b to be folded. When the sliding portion 31g comes into contact with the front end portion of the long groove 32b, the pillion seat 31 falls down onto the fuel tank 27, thus being closed. At this time, the left and right lock fittings 31b are locked by the filler-side locking mechanisms 90R and 90L.

Figure 19:
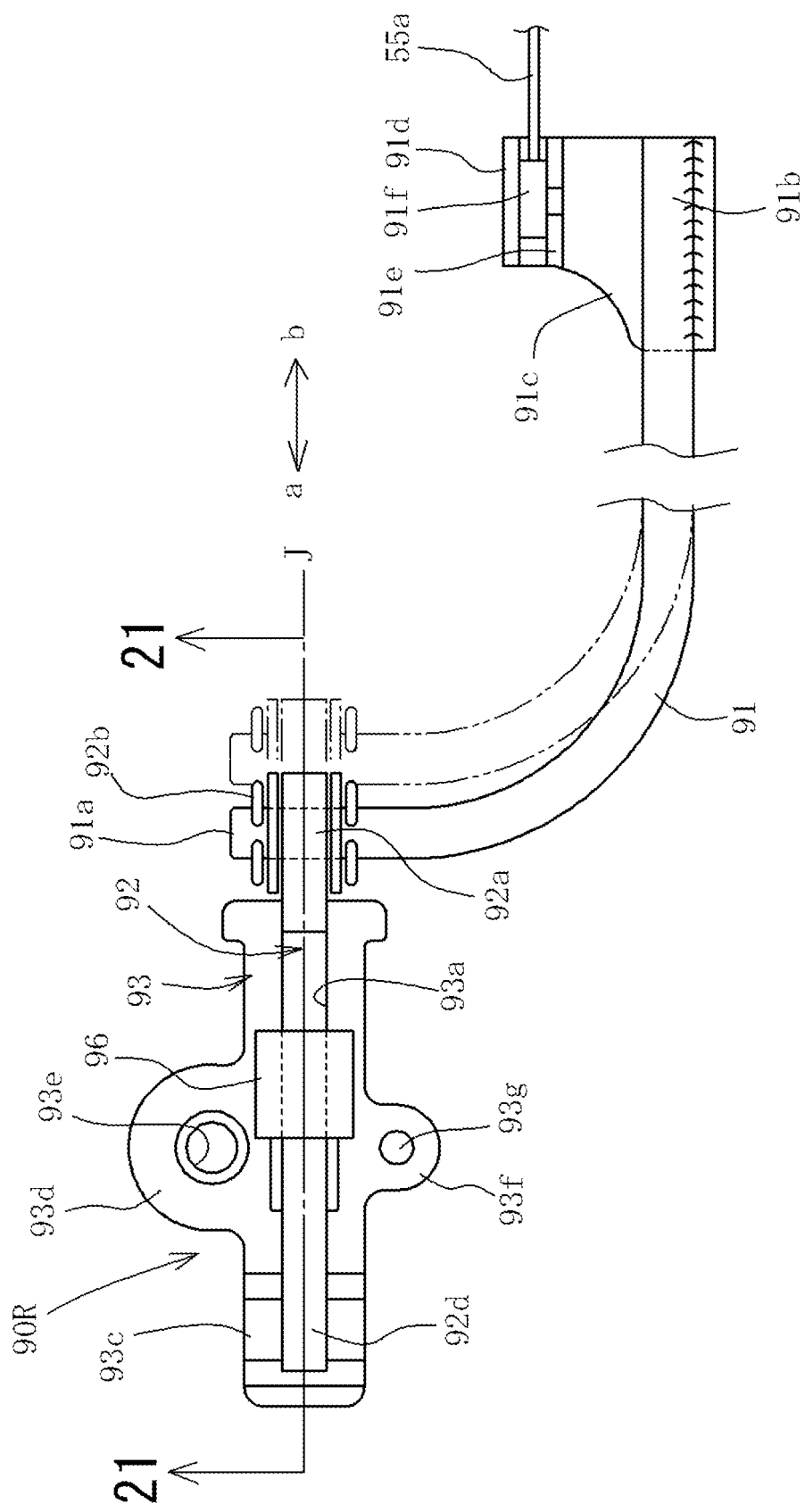
FIG. 19 is a plan view of a filler-side locking mechanism.
Figure 20:
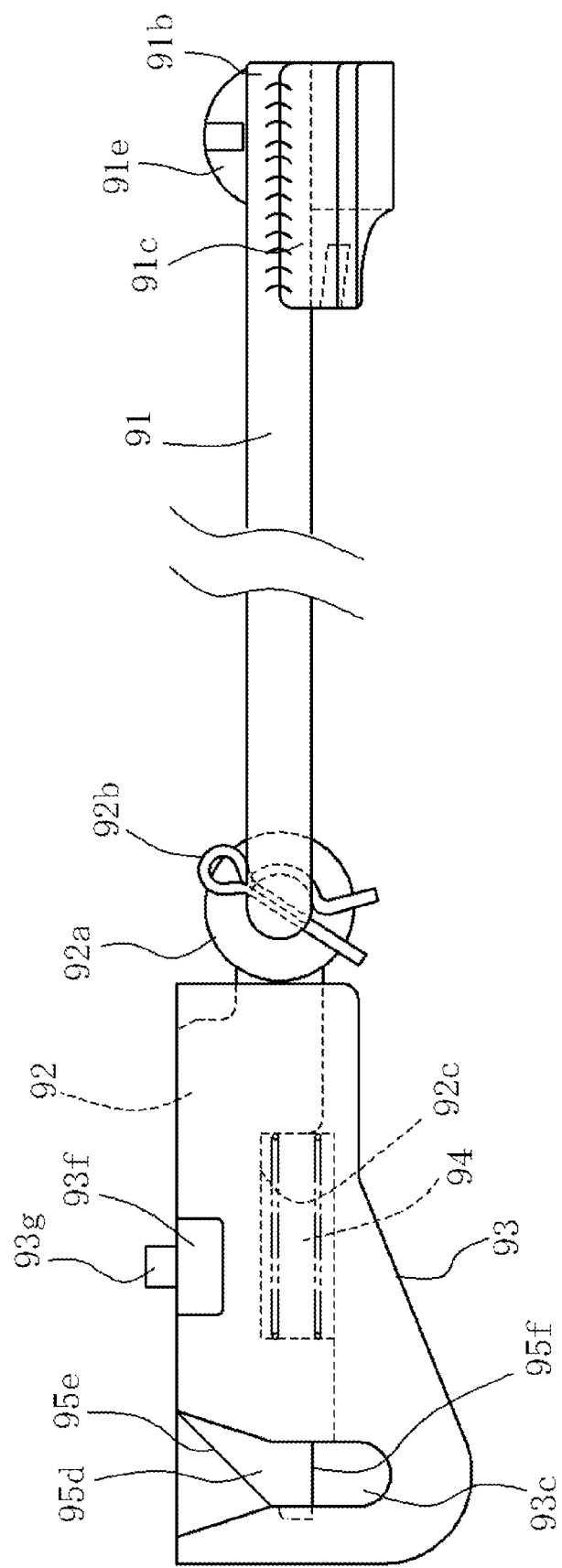
FIG. 20 is a side view of the filler-side locking mechanism.
Figure 21:
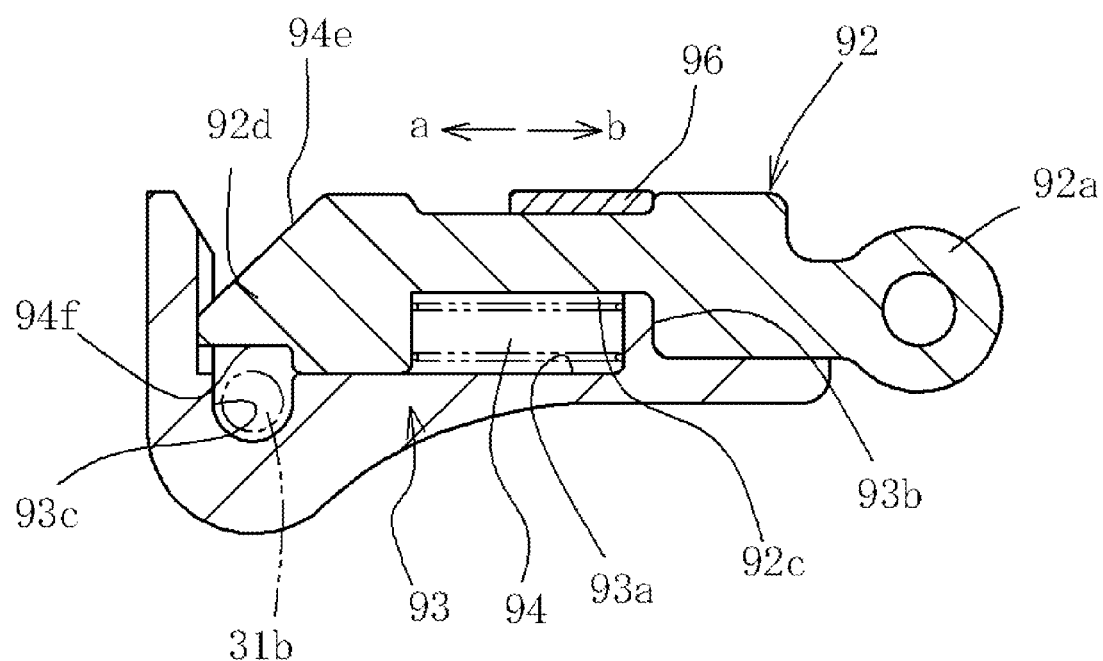
FIG. 21 shows an enlarged cross section of a locking portion.

FIG. 19 is a plan view of the filler-side locking mechanism 90R provided on the right side of the vehicle body. FIG. 20 is a side view thereof. FIG. 21 shows an enlarged cross section (cross section taken along the line 21-21 in FIG. 19) of the locking portion thereof. Note that the right and left filler-side locking mechanisms 90R and 90L are different only in the coupling structure to the filler-side cable 55 and the main body portions of the locking mechanisms are the same. The filler-side locking mechanism 90R on the right side includes a coupling rod 91, which is a coupling portion to the filler-side cable 55, as well as a sliding portion 92 and a receiving portion 93, which are the main body portion of the locking mechanism.

The coupling rod 91 is bent into a substantially L-shape in a plan view, and one end portion 91a thereof which is bent penetrates a ring portion 92a formed in one end of the sliding portion 92, and is coupled thereto with a cotter pin 92b.

A coupling fitting 91c is welded to another end portion 91b of the coupling rod 91. The coupling fitting 91c includes a pair of wall portions 91d and 91e parallel to each other with a slight interval. A locking member 91f is engaged with a gap groove between the wall portions 91d and 91e. An end (rear end) of the inner cable 55a included in the filler-side cable 55 is coupled to the locking member 91f. A guide 48g is formed to extend in a vehicle width direction, in the edge portion of the locking-portion cross plate 48. The wall portion 91e on the inner side (side close to the coupling rod 91) is configured to slide on the guide 48g, thereby moving the coupling rod 91 along the guide 48g in the vehicle width direction.

A sliding groove 93a is formed in the longitudinal direction in the receiving portion 93. The sliding portion 92 is fitted into the sliding groove 93a. The sliding portion 92 is thus movable in the longitudinal direction relative to the receiving portion 93. The movement axis of the sliding portion 92 is denoted by J. In addition, the movement of the sliding portion 92 along the movement axis J is referred to as advancement and retreat. The movement toward the front end side opposite to the ring portion 92a (movement in the direction indicated by the arrow a in the figure) is referred to as an advancement while the movement in the opposite direction (the movement in the direction indicated by the arrow b in the figure) is referred to as retreat.

Reference Numeral 96 denotes a disintegration-prevention plate, which is for making the handling favorable by preventing the sliding portion 92 from getting out of the receiving portion 93 at the stage before the attachment of the filler-side locking mechanism 90R to the vehicle body side, and accordingly, the disintegration-prevention plate 96 is removed at the time of the attachment to the vehicle body.

A pair of attachment portions 93d and 93f bulges to the left and right on the middle portion of the receiving portion 93 in the longitudinal direction with the sliding groove 93a interposed therebetween. A screw hole 93e is formed in the one attachment portion 93d. The receiving portion 93 is fixed to the side portion 48b of the locking-portion cross plate 48 by fastening a bolt 95 to the screw hole 93e.

A protrusion 93g protruding upward is provided on the other attachment portion 93f. The protrusion 93g is fitted into a positioning hole (illustration of which is omitted) provided in the side portion 48b of the locking-portion cross plate 48, making it possible for the receiving portion 93 to be fastened to the locking-portion cross plate 48 with the bolt 95 while being positioned and prevented from turning.

As shown in FIG. 21, a recess portion 92c is formed in the middle portion of the sliding portion 92 in the longitudinal direction. A locking portion 92d is formed in the front end of the sliding portion 92. A stopper 93b formed to protrude from the sliding groove 93a is fitted into the end portion of the recess portion 92c on the ring portion 92a side (hereinafter, referred to as a rear end portion), and comes into contact with the rear end portion of the recess portion 92c, thereby positioning at the time when the sliding portion 92 advances relative to the receiving portion 93.

A return spring 94 is accommodated in the recess portion 92c. The return spring 94 is arranged between the front end of the recess portion 92c and the stopper 93b to bias the sliding portion 92 in the advancing direction relative to the receiving portion 93.

A receiving groove 93c having a substantially U-shape in the side view of FIG. 21 and opened upward is formed in the front end portion of the receiving portion 93. The locking portion 92d protrudes into the receiving groove 93c.

The locking portion 92d has an upper surface formed into a slope 92e inclined downward to the front and has a substantially horizontal lower surface 92f. A space for accommodating the lock fitting 31b is formed between the lower surface of the locking portion 92d and the bottom portion of the receiving groove 93c. Advancing the locking portion 92d with the lock fitting 31b accommodated in the bottom portion of the receiving groove 93c establishes an engaged state where the locking portion 92d prevents the lock fitting 31b from getting out. Moreover, retreating the locking portion 92d against the return spring 94 in this state causes the locking portion 92d to open the receiving groove 93c, allowing the lock fitting 31b to get out of the receiving groove 93c.

Accordingly, in the state shown in FIG. 21, when the pillion seat 31 is closed to thrust the lock fitting 31b into the receiving groove 93c from above and below, the lock fitting 31b pushes the slope 92e, which is the upper surface of the locking portion 92d, thus causing the locking portion 92d to retreat against the return spring 94, so that the lock fitting 31b reaches the bottom portion of the receiving groove 93c beyond the locking portion 92d.

Then, since there is no pushing force of the lock fitting 31b any more, the locking portion 92d is caused to advance again by the return spring 94 to protrude into the receiving groove 93c above the lock fitting 31b. Accordingly, the lock fitting 31b is locked by the locking portion 92d, so that the pillion seat 31 becomes in the locked state.

Further, in the locked state, when the inner cable 55a of the filler-side cable 55 is pulled to move the coupling rod 91 in the direction indicated by the arrow b in FIG. 19, the sliding portion 92 retreats against the return spring 94 to move off the receiving groove 93c, releasing the lock fitting 31b. Accordingly, the pillion seat 31 becomes in the unlocked state, so that the pillion seat 31 can be opened.

The filler-side locking mechanism 90L on the left side of the vehicle body is also works substantially in the same manner as the filler-side locking mechanism 90R on the right side of the vehicle body, but is different in the structure of coupling with the filler-side cable 55.

Figure 22:
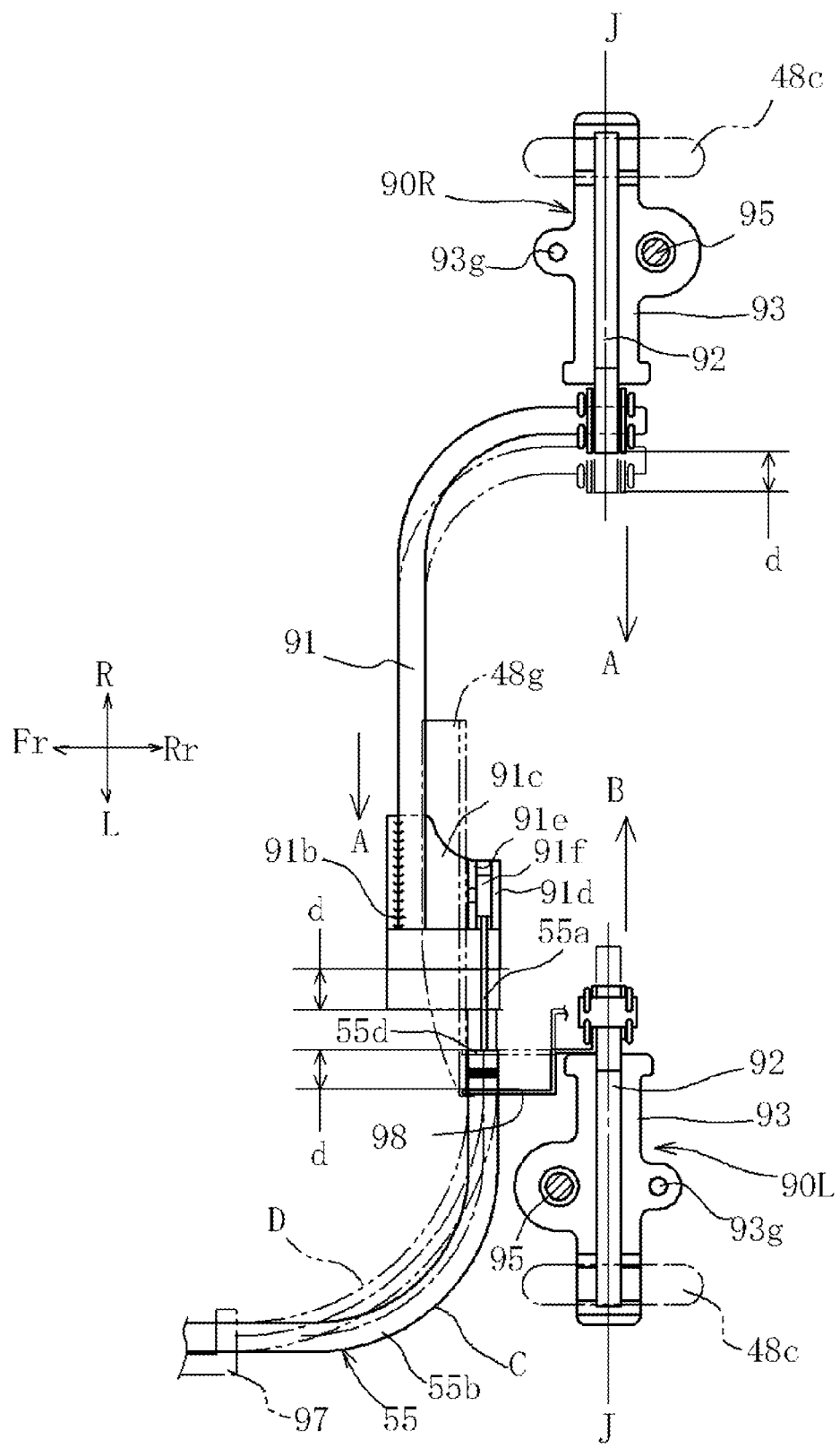
FIG. 22 is an explanatory view of unlocking operation in conjunction.

As shown in FIG. 22, the filler-side cable 55 extends inward of the vehicle body while curving at substantially 90° at the portion after the clamp 97, and the inner cable 55a extends long out of an end portion 55d of the outer cable 55b, and is coupled to the coupling fitting 91c of the coupling rod 91 in the filler-side locking mechanism 90R on the right side of the vehicle body.

On the other hand, the end portion 55d of the outer cable 55b is coupled to the ring portion 92a of the sliding portion 92 by a rigid stay 98 made of metal or resin and bent into a substantially crank shape.

For this reason, when the inner cable 55a is pulled to pull the coupling rod 91 in the direction indicated by the arrow A, the filler-side locking mechanism 90R on the right side of the vehicle body is unlocked with the sliding portion 92 being pulled in the direction indicated by the arrow A. At the same time, the filler-side locking mechanism 90L on the left side of the vehicle body is also unlocked in conjunction, with the sliding portion 92 being pulled in the direction indicated by the arrow B.

The operations of the right and left filler-side locking mechanisms 90R and 90L in conjunction will be further described. FIG. 22 is an explanatory view of the unlocking operation in which the right and left mechanisms are operated in conjunction. In the figure, when the inner cable 55a is pulled in the direction indicated by the arrow A, the length from the clamp 97 to the coupling fitting 91c is shortened to move the coupling rod 91 guided by the guide 48g in the direction indicated by the arrow A by a stroke d corresponding to the amount of change in the length, and to simultaneously move the sliding portion 92 in the direction indicated by the arrow B by the stroke d to unlock.

At this time, the curved portion of the filler-side cable 55 after the clamp 97 moves frontward by the shortened amount of the inner cable 55a to change the degree of curve, to shift from an initial state indicated by C to a state indicated by D.

On the other hand, the outer cable 55b is fixed by the clamp 97, and the length from the clamp 97 to the end portion 55d is constant. For this reason, the end portion 55d relatively advances in the direction indicated by the arrow B by the stroke d. As a result, the sliding portion 92 is moved in the direction indicated by the arrow B by the stroke d to be unlocked in conjunction.

This configuration makes it possible to easily construct the unlocking operation mechanism in which the left and right filler-side locking mechanisms 90L and 90R are operated in conjunction by utilizing the difference in movement between the inner cable 55a and the outer cable 55b.

Figure 23:
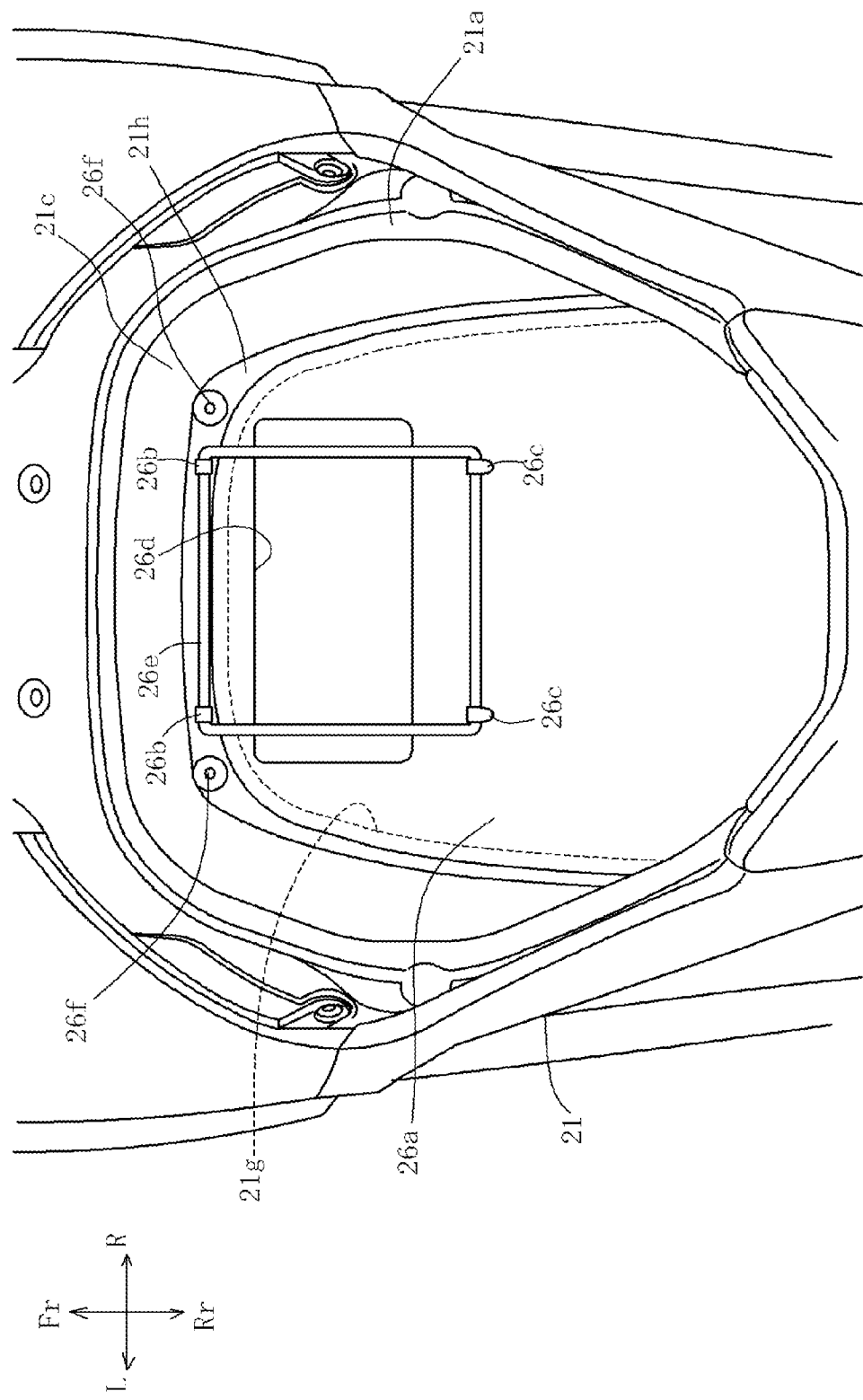
FIG. 23 is a perspective view showing an internal structure of the storage box.

FIG. 23 is a perspective view from the rear side and obliquely above of the vehicle body (in the direction indicated by the arrow XXIII in FIG. 1) for showing the internal structure of the storage box 21. This figure shows a state where the opening 21g, which is relatively large and open over a substantially vertical entirety of the front face of the storage box 21 (see FIG. 4), is covered with the separate front-surface lid 26a. The tool box 26 is provided to protrude frontward on the upper portion of the front-surface lid 26a (see FIG. 1). The tool box 26 forms a recess portion open to the inside of the storage box 21, and an elastic ring 26e for preventing the contents from falling down is attached to an opening portion 26d of the tool box 26. The elastic ring 26e is a ring-shaped member made of an elastic material such as a rubber cord, and is locked with hook fittings 26b and 26c provided on the left and right sides of each of the upper and lower portions of the opening portion 26d.

Note that the front-surface lid 26a is attachable and detachable. Removing the front-surface lid 26a opens the opening 21g on the front face of the storage box 21. The battery case 24 (FIG. 1) is disposed in contact with and frontward of the opening 21g. The battery case 24 is open to the rear and an opening portion thereof faces the opening 21g, where the attachment and detachment as well as maintenance of the battery can be conducted from the inside of the storage box 21.

A saddle-ride vehicle according to the embodiment of the present invention includes: a vehicle-body frame having a head pipe and left and right main frames extending rearward from the head pipe; an engine supported on the vehicle-body frame; a seat on which a driver seats; a storage box disposed between the left and right main frames (12) and being open upward; a box lid openably and closably covering an opening portion of the storage box, the opening portion opening upward; a box-side locking mechanism configured to lock the box lid; a filler lid (for example, a pillion seat 31 in an embodiment) openably and closably covering a fuel filler of a fuel tank; a filler-side locking mechanism configured to lock the filler lid. An unlocking mechanism including a key cylinder which is key-operated is disposed between the head pipe and the storage box. A box-side cable and a filler-side cable are connected to the key cylinder, the box-side cable being configured to be caused to unlock a lock of the box-side locking mechanism by turning a key in one of a clockwise direction and a counterclockwise direction, the filler-side cable being configured to be caused to unlock a lock of the filler-side locking mechanism by turning the key in the other of the clockwise direction and the counterclockwise direction.

In the saddle-ride vehicle according to the embodiment of the present invention, the key cylinder is attached to a key stay, the key stay has an insertion hole through which the key cylinder is inserted, and left and right cable stays configured to support the filler-side cable and the box-side cable are provided on left and right of the insertion hole, respectively.

In the saddle-ride vehicle according to the embodiment of the present invention, an air cleaner configured to supply purified air to the engine is attached below the key stay, and the box-side cable is routed once from the key cylinder to an outer side of an outermost end portion of the air cleaner in a vehicle width direction, and is then connected to the box-side locking mechanism.

In the saddle-ride vehicle according to the embodiment of the present invention, a key stay cover (for example, a front top cover 23 in the embodiment) is disposed above the key stay, an air cleaner cover is provided below the key stay and above the air cleaner, and the key stay, the key stay cover, and the air cleaner cover are fastened together.

In the saddle-ride vehicle according to the embodiment of the present invention, a key operation sign indicating objects and directions of unlocking operation using the key is formed integrally on an upper surface of the key stay cover around the key cylinder.

In the saddle-ride vehicle according to the embodiment of the present invention, a cable stay hole is provided in the air cleaner cover, and a ridge portion is provided to extend from a position near the cable stay hole to an outer side in the vehicle width direction, a cable stay of the key stay is inserted through the cable stay hole, and the filler-side cable is arranged below the ridge portion of the air cleaner cover.

In the saddle-ride vehicle according to the embodiment of the present invention, one ends of two cables, which are the box-side cable and the filler-side cable, are connected to the common key cylinder. The other end of the box-side cable is connected to the box-side locking mechanism while the other end of the filler-side cable is connected to the filler-side locking mechanism. These cables are configured to be operated selectively depending on the direction of turning the key relative to the key cylinder. This makes it possible that turning the key in one of the clockwise direction and the counterclockwise direction causes only one of the box-side cable and the filler-side cable to be operated to effect an unlocking operation to release the lock of one of the box-side locking mechanism and the filler-side locking mechanism connected thereto. In addition, this also makes it possible that turning the key in the other direction causes only the other cable to be operated to release the lock of the other mechanism connected thereto.

Accordingly, the two separately arranged locking mechanisms can be operated to be unlocked by using the single unlocking mechanism having the common key cylinder. For this reason, the locking mechanisms respectively for two separately arranged lids can be unlocked with a configuration having a relatively simple structure with a small number of components and being low in cost. Moreover, such a single unlocking mechanism capable of commonly operating two locking mechanisms can be arranged between the head pipe and the storage box in a space-efficient manner.

In the saddle-ride vehicle according to the embodiment of the present invention, the cable stay portions are provided on the left and right of the key stay supporting the key cylinder, and the left and right cables are supported on the cable stay portions. For this reason, the key stay can be used also as a cable supporting member, making it possible to reduce the number of components.

In the saddle-ride vehicle according to the embodiment of the present invention, the length of the cable can be increased by routing once the cable to an outer side of the outermost side portion of the air cleaner in the vehicle width direction, and then folding back the cable to the locking mechanism side. This make it possible to move the key stay widely rearward with the cable attached thereto at the time of maintenance of the air cleaner, and to prevent the cable from interfering at the time of maintenance, thus improving the maintainability.

In the saddle-ride vehicle according to the embodiment of the present invention, the key stay is disposed below the key stay cover to be externally invisible, so that the exterior appearance can be improved, and also can be fastened together with the air cleaner cover, which is a component below the key stay, so that the number of components and the number of fastening portions can be reduced.

In the saddle-ride vehicle according to the embodiment of the present invention, the key operation sign indicating objects and directions of unlocking operation using the key is provided integrally on the key stay cover. This makes it possible to improve the convenience in use and to reduce the number of components as compared to the case where the operation sign is formed separately from the key stay cover and is attached to the key stay cover.

In the saddle-ride vehicle according to the embodiment of the present invention, the key stay, the air cleaner cover, and the cables can be attached as compact as possible with no interference with one another.

Obviously, numerous modifications and variations of the present invention are possible in light of the above teachings. It is therefore to be understood that within the scope of the appended claims, the invention may be practiced otherwise than as specifically described herein.

What is claimed is:

1. A saddle-ride vehicle comprising:
    a vehicle-body frame having a head pipe and left and right main frames extending rearward from the head pipe;
    an engine supported on the vehicle-body frame;
    a seat on which a driver is to sit;
    a storage box disposed between the left and right main frames and including an opening portion opening upward;
    a box lid to openably and closably cover the opening portion of the storage box;
    a box-side locking mechanism to lock the box lid;
    a filler lid to openably and closably cover a fuel filler of a fuel tank;
    a filler-side locking mechanism to lock the filler lid;
    an unlocking mechanism including a key cylinder which is key-operated, the unlocking mechanism being disposed between the head pipe and the storage box;
    a box-side cable connected to the key cylinder, the box-side cable being configured to unlock a lock of the box-side locking mechanism by turning a key in one of a clockwise direction and a counterclockwise direction; and
    a filler-side cable connected to the key cylinder, the filler-side cable being configured to unlock a lock of the filler-side locking mechanism by turning the key in another of the clockwise direction and the counterclockwise direction,
    wherein the key cylinder includes a first cable coupling arm portion and a second cable coupling arm portion, the box-side cable is coupled to the first cable coupling arm portion and the filler-side cable is coupled to the second cable coupling arm portion, and
    wherein the first cable coupling arm portion is provided above the second cable coupling arm portion.

2. The saddle-ride vehicle according to claim 1, further comprising:
    a key stay to which the key cylinder is attached, the key stay having an insertion hole through which the key cylinder is inserted;
    a left cable stay provided on left of the insertion hole to support the filler-side cable; and
    a right cable stay provided on right of the insertion hole to support the box-side cable.

3. The saddle-ride vehicle according to claim 2, further comprising:
    an air cleaner to supply purified air to the engine, the air cleaner being attached below the key stay, wherein
    the box-side cable is routed once from the key cylinder to an outer side of an outermost end portion of the air cleaner in a vehicle width direction, and is connected to the box-side locking mechanism.

4. The saddle-ride vehicle according to claim 3, further comprising:
    a key stay cover disposed above the key stay;
    an air cleaner cover provided below the key stay and above the air cleaner, wherein
    the key stay, the key stay cover, and the air cleaner cover are fastened together.

5. The saddle-ride vehicle according to claim 4, further comprising:
    a key operation sign indicating objects and directions of unlocking operation using the key, the key operation sign being integrally provided on an upper surface of the key stay cover around the key cylinder.

6. The saddle-ride vehicle according to claim 4, further comprising:
    a cable stay hole provided in the air cleaner cover; and
    a ridge portion provided to extend from a position near the cable stay hole to an outer side in the vehicle width direction, wherein
    a cable stay of the key stay is inserted through the cable stay hole, and
    the filler-side cable is arranged below the ridge portion of the air cleaner cover.

7. The saddle-ride vehicle according to claim 1, wherein
    the box-side cable is provided to transmit an unlocking operation of the key cylinder to the box-side locking mechanism, and
    the filler-side cable is provided to transmit an unlocking operation of the key cylinder to the filler-side locking mechanism.

8. The saddle-ride vehicle according to claim 1, wherein
    the box-side cable is provided to unlock a lock of the box-side locking mechanism by turning the key in one of the clockwise direction and the counterclockwise direction when the key cylinder is seen from above, and
    the filler-side cable is provided to unlock a lock of the filler-side locking mechanism by turning the key in another of the clockwise direction and the counterclockwise direction when the key cylinder is seen from above.

9. The saddle-ride vehicle according to claim 8, wherein
    the box-side cable is provided to unlock a lock of the box-side locking mechanism by turning the key in the clockwise direction when the key cylinder is seen from above, and
    the filler-side cable is provided to unlock a lock of the filler-side locking mechanism by turning the key in the counterclockwise direction when the key cylinder is seen from above.

* * * * *